(12) United States Patent
Barker et al.

(10) Patent No.: US 8,732,845 B1
(45) Date of Patent: *May 20, 2014

(54) METHODS SYSTEMS AND ARTICLES OF MANUFACTURE FOR GENERATING AND DISPLAYING VIDEO RELATED TO FINANCIAL APPLICATION

(75) Inventors: Steven C. Barker, Tuscon, AZ (US); Benjamin J. Kanspedos, Tuscon, CA (US)

(73) Assignee: Intuit Inc., Mountain View, CA (US)

(*) Notice: Subject to any disclaimer, the term of this patent is extended or adjusted under 35 U.S.C. 154(b) by 197 days.

This patent is subject to a terminal disclaimer.

(21) Appl. No.: 13/475,626

(22) Filed: May 18, 2012

Related U.S. Application Data

(63) Continuation of application No. 12/358,545, filed on Jan. 23, 2009, now Pat. No. 8,191,152.

(51) Int. Cl.
*H04L 29/06* (2006.01)

(52) U.S. Cl.
USPC ............................ 726/26; 726/6; 704/244

(58) Field of Classification Search
USPC ..................... 726/6, 26; 704/244
See application file for complete search history.

(56) References Cited

U.S. PATENT DOCUMENTS

2007/0282737 A1 12/2007 Brasch
2008/0208579 A1* 8/2008 Weiss et al. ............... 704/244

OTHER PUBLICATIONS

Non Patent Literature in U.S. Appl. No. 12/358,545, filed Jan. 23, 2009.

* cited by examiner

*Primary Examiner* — Brandon Hoffman
*Assistant Examiner* — Thong Truong
(74) *Attorney, Agent, or Firm* — Vista IP Law Group LLP

(57) ABSTRACT

Systems, methods and articles of manufacture for generating a video such that when another person views the video, the other person can view non-private information but not private information of the person who generated the video. A first interview screen is generated by a financial application and displayed to a first person or user of a financial application. The screen includes private data related to the first person. A video of the interview screen is generated and may be transmitted over a network to a second person who may also utilize a financial application. The video is displayed to the second person, but the second person cannot view the private data related to the first person.

19 Claims, 25 Drawing Sheets

Send Us Feedback   Welcome, Guest! You aren't signed in. Sign In   — 110

My Q&A     All Q&A     Search Q&A: [          ]

All Questions and Answers

Topics (select a topic to view or ask questions)
- Buying and Using TurboTax — 116
  - Find the Right TurboTax for You
  - Install TurboTax — 112
  - Update TurboTax
  - Import and Transfer Your Information
- Preparing Your Federal Return
  - Basic Income
  - Investments, Rentals and K-1s
  - Schedule C for Personal Business
  - Deductions
  - Educations
  - Credit
  - Children and Dependents Topics
  - Retirement — 114
  - Other Tax Topics
- Preparing Your State Return(s)
  - Handling Multistate Returns
  - States Alabama-Florida
  - States Georgia-Louisiana
  - States Maine-Montana
  - States Nebraska-North Dakota
  - States Ohio-South Carolina
  - States Tennessee-West Virginia
- Finishing Your Return
  - Save and Print Your Return
  - Electronic Filing
  - Other Filing Topics
- TurboTax for Business
  - Corporations
  - S-Corporations
  - Partnerships and LLCs
  - Estates and Trusts
  - Business States
  - Other Business Topics
- General Discussion
  - Questions About Customer Service
- ItsDeductible Online
  - ItsDeductible Online
- Other Topics

What's TurboTax Live Community?
How do I get started?

Guest Asked   (Asked 11/20/07)

Answers (1)

TurboTax User Answered

TurboTax Live Community is a place where learn and share with other TurboTax users preparing your taxes.
Ask questions, view answers to questions topics that interest you. share your knowle experience with others.

Explore TurboTax Live Community by:
  Asking a question
  Seeing what others are asking
  Viewing answers to others' questi
  Answering a question
  Voting on answers (Posted 11/20/07)

| Personal Info | Business | Personal | Federal Review | State Taxes | Print & File |

Personal Income / Deductions & Credits / Other Tax Situation

Your Deductions and Credits

Select View List to open the full list of topics for each group. You can visit a specific topic in a group, or select Visit All to walk through an entire group.

— 1310 → Glossary of Deductions and Credits: See What You Can Deduct

Your Home — Property taxes, mortgage interest, energy improvements ⊕ View List

You and Your Family — Child care, Earned Income Credit, adoption expenses ⊕ View List

Donations powered by ItsDeductible® — Clothes and other items, money, miles driven, stock ⊕ View List

Cars and Other Things You Own — Registration fees, hybrid cars ⊕ View List

Education — Forms 1098-E and 1098-T (Student loans and college tuition) ⊕ View List

Medical — HSA, MSA, contributions, prescriptions, medical bills ⊕ View List

| Personal Info | Business | Personal | Federal Review | State Taxes | Print & File | |

( You & Your Family )

Enter Dependent Information

Not sure if someone is your dependent?  [ Guide Me ]  — 1350

| First Name | Heather | 1351a |
| Middle Initial | | 1351b |
| Last Name | ▓▓▓▓▓▓▓ | 1351c |
| Jr., Sr., etc. | | 1351d |
| Birth Date (mm/dd/yyyy) | 02/03/1999 | 1351e |
| Social Security Number | ▓▓▓▓▓▓▓ | 1351f |

Relationship
Explain This
[ Daughter ▼ ]

Dependent Type
Explain This
[ Your child living with you ▼ ]

Citizenship Status
Explain This

- Your child living with you
- Your child away at college
- Your child living with someone else
- Other dependent
- Nondependent - used for EIC/dependent care only
- Not a dependent this year

Disabled Dependent
Explain This

 Learn more about this topic

FIG. 13G

METHODS SYSTEMS AND ARTICLES OF MANUFACTURE FOR GENERATING AND DISPLAYING VIDEO RELATED TO FINANCIAL APPLICATION

CROSS-REFERENCE TO RELATED APPLICATION

This application is a continuation of U.S. application Ser. No. 12/358,545, filed on Jan. 23, 2009, now U.S. Pat. No. 8,191,152 issued on May 29, 2012, priority of which is claimed under 35 U.S.C. §120, and the contents of which are incorporated herein by reference as though set forth in full.

BACKGROUND

The invention relates to videos and financial applications such as tax preparation applications for preparing electronic tax returns. Financial applications such as personal finance applications, accounting applications and tax preparation applications have become very popular and allow people to manage personal and/or business finances. For example, users of tax preparation applications such as a taxpayer or a tax professional can prepare and electronically file a tax return using a computer. Certain tax preparation applications present a list of tax-related questions and data entry fields to the user as a series of interview screens or fillable forms in response to which the appropriate data or answers is entered if they are known. Interview screens and questions may involve non-private information such as a person's occupation and private or sensitive information such as a name (or portion thereof), an address, a social security number, and a date of birth of the person or someone in the person's family. Other interview screens and questions may relate to private or sensitive financial information such as wages, retirement plan contributions, and federal taxes that were paid or withheld as provided in Form-W2. A completed electronic tax return is formatted as necessary and electronically filed with a tax authority such as the Internal Revenue Service, a state tax authority or other tax collecting entity.

While finance applications such as tax preparation applications have greatly simplified finance management and preparation of tax returns, such applications can be improved. For example, a person who uses a tax preparation application may have a question or comment regarding a particular finance or tax issue or how to complete an interview screen or form that is presented to the user. One option is for the person to submit an e-mail or typed message to an on-line community or group or a technical support person. A member of the on-line community or technical support person may respond to the message with an e-mail or typed response addressing the question or comment.

One example of such interaction involves TurboTax®. TurboTax® is a registered trademark of Intuit, Inc. During preparation of the electronic tax return, a user of TurboTax® may present a question to members of Live Community, which is an on-line forum or community that allows TurboTax® users to submit questions and answers to other users, share TurboTax® information with other users, and review questions and answers submitted by other TurboTax® users. For example, as shown FIG. 1A, after a user launches and signs into Live Community, the user is presented with a screen, window or interface 100 that allows the user to type a question or comment into a data entry field 102. After completing the question or comment, the user presses "Ask The Community" 104 to submit the text to Live Community. Other members of Live Community can review the question or comment and reply thereto with their own typed or text responses.

The question or comment may also be included in a topic list for other users to review. For example, FIG. 1B illustrates a screen or interface 110 of Live Community that includes a window or section 112 for a question or comment and a window or section 114 for an answer or response thereto. The screen 110 also includes a list 116 of topics of questions, comments and answers that can be searched or reviewed by members or users of Live Community.

Typed or e-mail communications may be suitable in certain situations, but there are times when a comment, question or answer is best communicated visually to other members of Live Community or other on-line forums such as YouTube®. YouTube® is a registered trademark of Google, Inc. For this purpose, a person can record a video of the interview screen that is the subject of the question or answer and post the video to the on-line video community. Other members of that video community can view posted video and respond thereto with their own text or video reply.

While video may provide for more effective audio and/or video communication, use of video, particularly in the context of financial applications such as tax preparation applications, presents a number of issues. For example, the video may include an interview screen or a portion of a tax return and that includes private or sensitive information when such information should not be or is ordinarily not disclosed to other people. For example, the video may include one or more of a name, an address, a phone number and a social security number of the person preparing the electronic tax return or someone in his or her family. Consequently, users of tax preparation applications and other financial applications that involve interview screens including private or sensitive information are understandably apprehensive about posting videos including their private or sensitive information to on-line video communities. Thus, video may not be used for this purpose in order to protect the user's privacy and guard against identity theft. Otherwise, someone posting a video with private or sensitive information takes the risk that another person who views the video and the private information therein will not improperly utilize or steal the private information. These restrictions and significant shortcomings and risks, therefore, limit the use of video to communicate comments, questions and answers involving private or sensitive information, thereby reducing the content and effectiveness of using video in the context of financial applications.

SUMMARY

One embodiment is directed to a method for processing a video related to a financial application. The method comprises displaying to a first person a first screen generated by a first financial application, the first screen comprising first data. The method further comprises generating a first video of the first screen such that a portion of the first data displayed on the first screen cannot be viewed by a second person when the first video is displayed to the second person.

A further embodiment is directed to an article of manufacture. The article of manufacture comprises a computer program carrier readable by a computer and embodying one or more instructions executable by the computer to perform method steps for processing a video related to a financial application. The method steps comprise displaying to a first person a first screen generated by a first financial application, the first screen comprising first data, and generating a first video of the first screen such that a portion of the first data displayed on the first screen cannot be viewed by a second person when the first video is displayed to the second person.

Another embodiment is directed to a system for processing a video related to a financial application. The system comprises a first computer and a second computer. The first computer comprises a first display and a first processor for executing a first financial application. The second computer is operably coupled to the first computer by a network and comprises a second display and a second processor. The first financial application is executable or operable to display to a first person utilizing the first computer a first screen comprising first data and to generate a first video of the first screen. The first video is generated such that a portion of the first data displayed on the first screen cannot be viewed by a second person utilizing the second computer when the first video is displayed to the second person.

In one or more embodiments, private or sensitive portions of the data are blurred or masked such that they cannot be viewed by another person when a video is displayed to the other person. This can be done during or after generation of the video. Private or sensitive data that may be blurred, masked, excluded or hidden in some other manner includes, but is not limited to, private financial data and private personal or personal identification data such as a name, an address, a phone number, a social security number and a date of birth.

In one or more embodiments, a financial application that is utilized with or that includes embodiments is a personal finance application, an accounting application or a tax preparation application. With a tax preparation application, for example, a portion of the data that is generated during preparation of an electronic tax return is not to be displayed to another person.

Certain embodiments are implemented on a computer, and other embodiments may involve transmitting the video to another user on a network. In certain embodiments, the first video is transmitted from the first computer utilized by the first person over a network to a second computer utilized by the second person. The first video is displayed to the second person, but not the private portions of data that were blurred or excluded from the first video. Blurring or masking of data may be done while a video is generated, or after the video is generated and transmitted to, e.g., an intermediate server, but before the video is displayed to another person such as a user of a second financial application such as a second personal finance application, a second accounting application or a second tax preparation application.

A second person, such as a user of a second financial application, may view the first video (having masked or blurred portions) prepared by the first person and respond to the first person. A response may be by text or e-mail. The response may also be a video. For example, a second user may view a second screen having second data generated by the second financial application. A second video of the second screen, e.g., a video generated in response to the first video), is generated such that a portion of the second data displayed on the second screen cannot be viewed by the first person when the second video is displayed to the first person. Blurring or masking of the second video can be performed during or after the second video is generated. The second video may be transmitted from a second computer utilized by the second person over the network to the first computer utilized by the first person and displayed to the first person.

In certain embodiments, the first video comprises one or more frames, each of which includes one or more fields for the first data. The first financial application is operable to tag one or more fields within one or more frames to indicate a portion of first data that is not to be viewed by the second person. Fields to be blurred or masked can be identified based at least in part upon a location of the tagged field within a frame. Fields to be blurred or masked can also be identified based at least in part upon an identifying attribute such as an outline, a pattern, a color, a brightness or other visual or identifying attribute of the field or portion or border thereof. In certain embodiments involving an identifying attribute and an on-line version of a financial application, a server that is operably coupled to a first computer comprises a second video processing element that is operable to mark a tagged field with an identifying attribute that is displayed on the first computer. The first video processing element on the first computer is operable to detect the identifying attribute to identify the tagged field and blur or mask the identified tagged field such that the portion of the first data is excluded from the first video and cannot be viewed by the second person.

Thus, with embodiments, a person who utilizes a financial application can generate videos while preventing private information from being displayed to other people who may or may not utilize a financial application. In this manner, more content rich video questions and answers can be transmitted while protecting private information in order to maintain privacy and reduce misappropriation of such information and identity theft.

BRIEF DESCRIPTION OF THE DRAWINGS

The foregoing and other aspects of embodiments are described in further detail with reference to the accompanying drawings, wherein:

FIG. 1B illustrates another known user interface that that allows a user to type a question or comment to an on-line community or forum and that includes a topic list;

FIGS. 13A-G illustrate examples of user interfaces or display screens and how a first video generated by a first person can be viewed by a second person while blurring or masking private information of the first person;

DETAILED DESCRIPTION OF ILLUSTRATED EMBODIMENTS

Figure 1A:
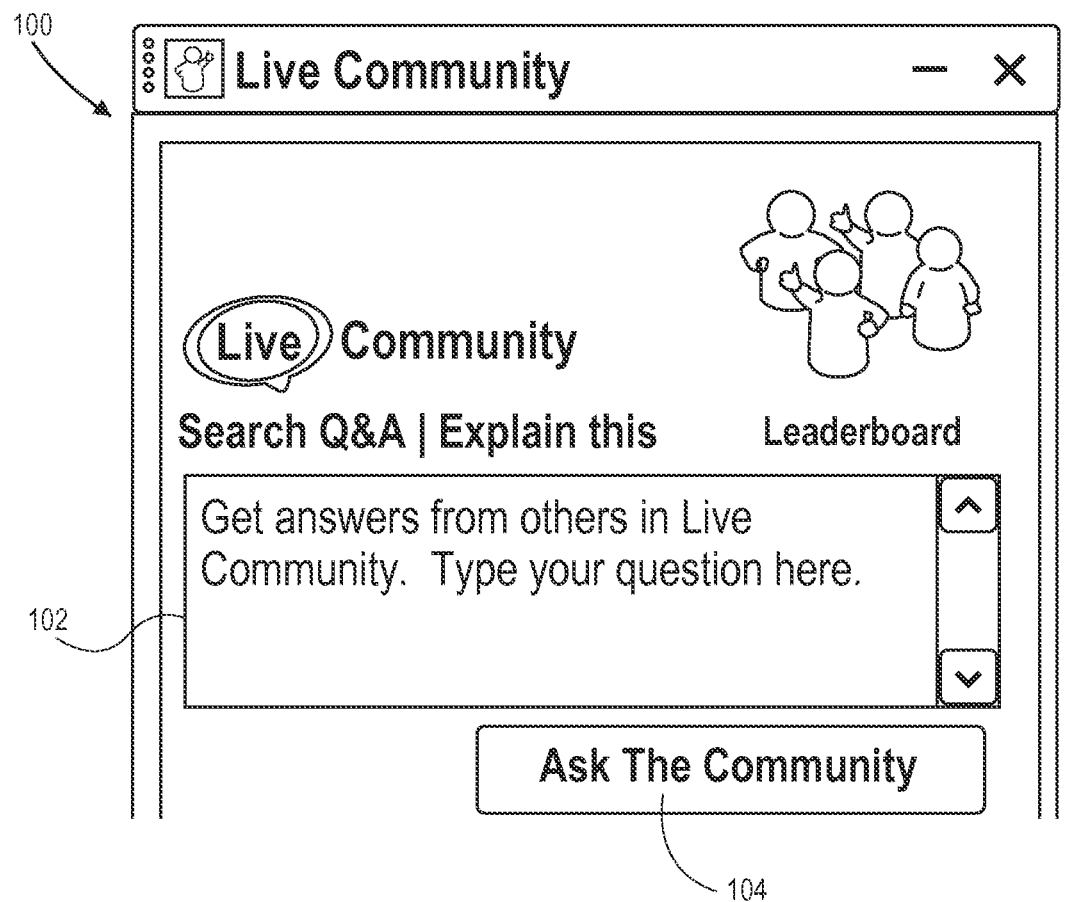
FIG. 1A illustrates a known user interface that allows a user of a financial application to type a question or comment and send the typed question or comment to an on-line community or forum.

Embodiments are directed to utilizing video as a medium for questions, answers and remarks that are submitted during use of a financial application such as a personal finance application, an accounting application and a tax preparation application. Embodiments allow a person to generate and submit a video to an on-line community or other forum in order to more effectively explain a question, an answer or a comment while preventing other members of the on-line community or forum, who may or may not be users of a financial application, from viewing the person's private or sensitive information. Embodiments provide a smart video generation device that is aware of private or sensitive information presented within an interview screen generated by a financial application such that a video of the interview screen can be used to communicate questions, answers or remarks while simultaneously hiding, blurring or masking private information within the video such that only non-private information can be viewed by others. Thus, embodiments allow for a more content rich medium to be utilized to effectively allow a person who uses a financial application to communicate questions and comments to third parties or other members of an on-line or video community or forum while preventing such other users from viewing private or sensitive information of the person in order to protect the person's privacy and guard against identity theft.

Embodiments for generating videos can be implemented using desktop and/or on-line versions of a financial application. In certain embodiments, e.g., with desktop application, fields are internally tagged or identified using software to indicate that they have private information. When these fields are to be displayed, the locations of the tags or tagged fields within a frame are provided to a video processing element, which applies a selective blur or masking element or algorithm to the content of the fields at these locations during or after generation of a video such that the private data is excluded from the video.

In certain other embodiments, e.g., with desktop and on-line versions of a financial application, generating a video and blurring or masking of private data is performed by utilizing an identifying attribute, which is detected to identify a field for private data that is blurred or masked. For example, a video processing element on a server that hosts an on-line version of a financial application includes a video processing element that tags fields for private data. The video processing element also associates an identifying attribute to the tagged fields, e.g., by outlining a tagged field. A video processing or capture element on a computer of a user of the financial application detects the identifying attribute, and a blur or masking element or algorithm is applied to the fields associated with the identifying attribute. The video having the masked or blurred private data may then be viewed by others while the user's private data is masked or blurred and not visible to others. Embodiments are described in further detail with reference to FIGS. 2-18.

Figure 2:
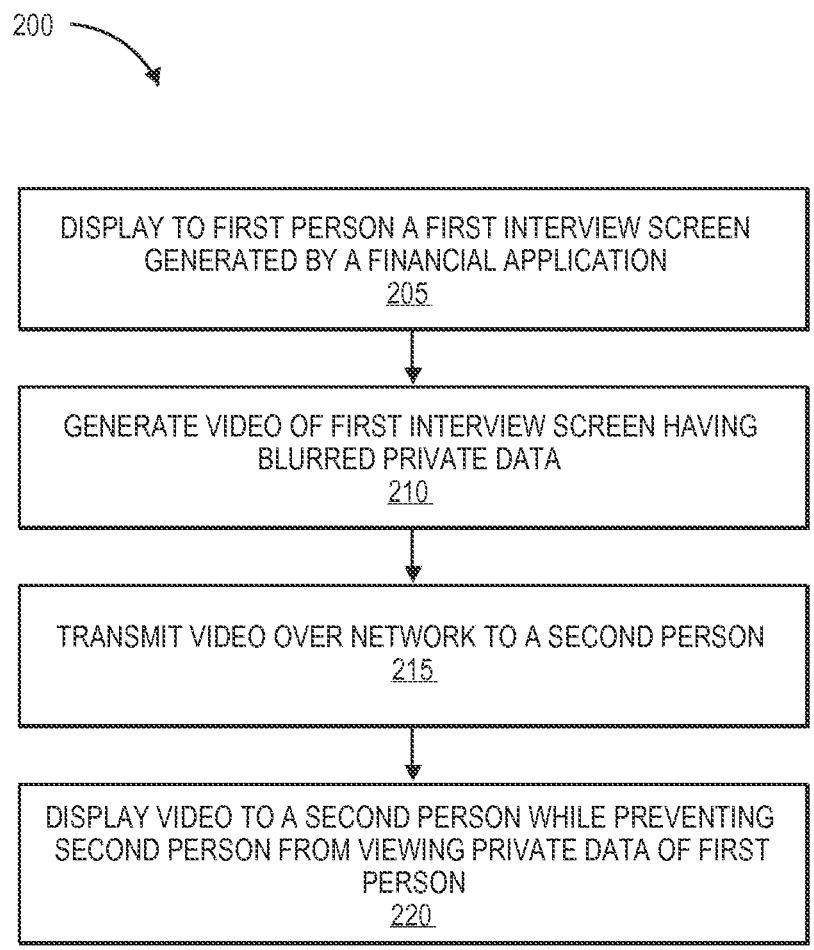
FIG. 2 is a flow chart of one embodiment of a method for generating a video and displaying selected portions of the video to prevent a person from viewing private information of another person.

Referring to FIG. 2, one embodiment is directed to a method 200 for generating a video related to a financial application that excludes private information such that when the video is displayed, non-private data or information is displayed. However, personal identification information (PII) or private, confidential or sensitive data or information (generally referred to as "private" data or "private" information) is not displayed since it is excluded, not visible, hidden or blurred. The method 200 comprises displaying to a person or a user of a financial application an interview screen or form generated by the financial application at stage 205. Data that is displayed to the person may include both non-private and private data. At stage 210, a video of the interview screen is generated or recorded. With embodiments, certain portions of the video are masked or blurred during or after the video is generated such that private data related to the person is excluded from the video. At stage 215, in certain embodiments involving a network, the video is transmitted over the network to another person. The other person may be a member of an on-line community or forum (who does not utilize a financial application), a member of a technical support team for the financial application or a second user of a second financial application, which may be the same as the first financial application. For ease of explanation, reference is made to a second person or user, but it should be understood that the video can be transmitted to various other people who may or may not utilize a financial application. Further, it should be understood that stage 215 is not necessary if the video is not transmitted over a network. At stage 220, the video is displayed to the second person who views the non-private video data, but not the private data related to the first person since portions of the video corresponding to the private data were masked or blurred or made unreadable as a result of application of embodiments.

Figure 3:
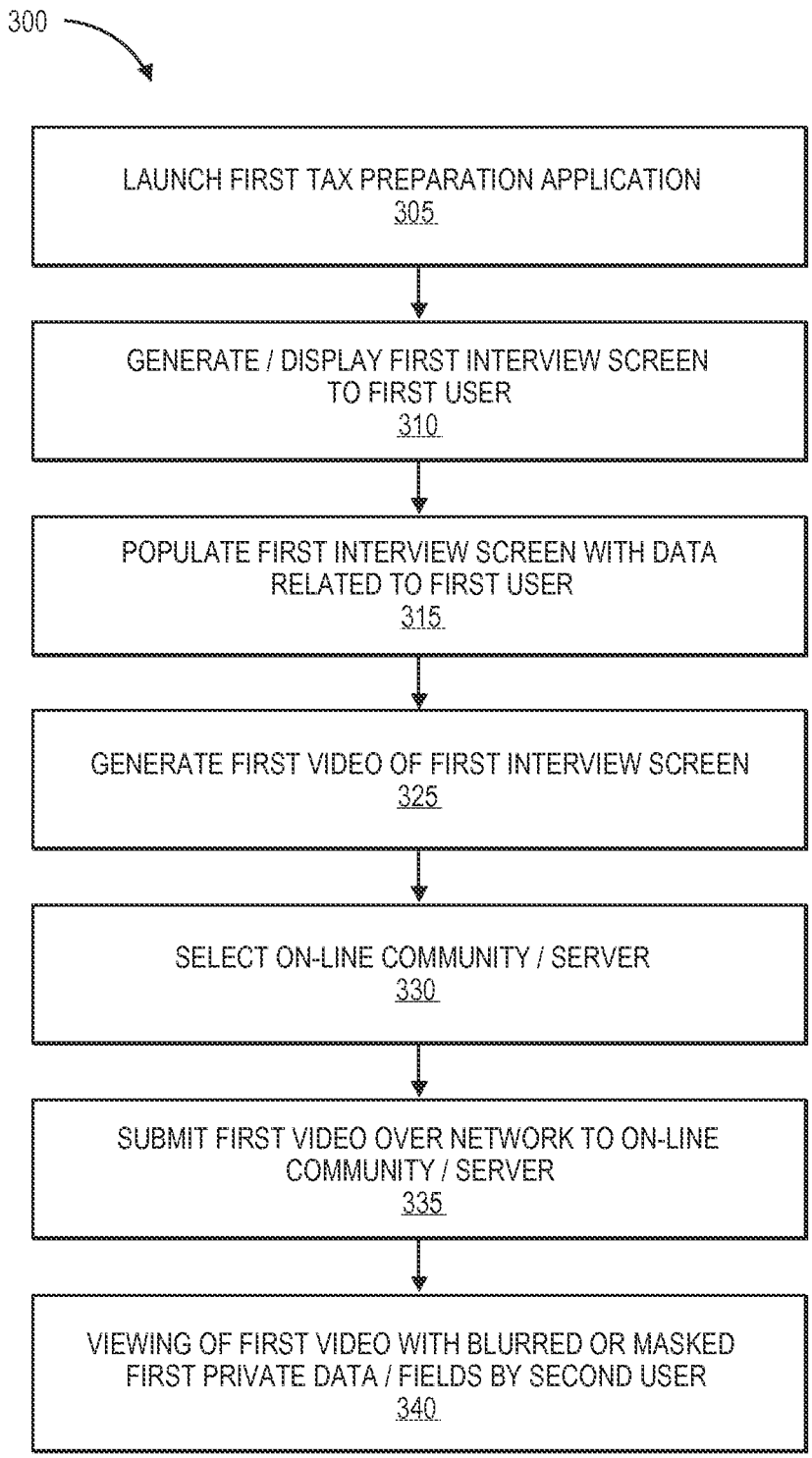
FIG. 3 is a flow chart of another embodiment of a method for generating a video and displaying selected portions of the video to prevent a person from viewing private information of another person.

Further aspects of embodiments are described with reference to FIGS. 3 and 4, which illustrate a method 300 and a system 400 constructed according to certain embodiments for generating and displaying a video such that private portions of the video are excluded and not visible as a result or blurring or masking the private portions. At stage 305, a first financial application 412 on a first computer 410 is launched or executed by a first person or user of a financial application 411 (generally referred to as first person 411). According to one embodiment, the first financial application 412 is a personal finance application, one example of which is Quicken®. Quicken® is a registered trademark of Intuit Inc. According to another embodiment, the first financial application 412 is an accounting application, one example of which is QuickBooks®. QuickBooks® is also a registered trademark of Intuit Inc. According to another embodiment, the first financial application 412 is a tax preparation application, examples of which include TurboTax®, ProSeries® and Lacerte®, which are known consumer and professional tax preparation applications available from Intuit Inc., H&R Block TaxCut, available from H&R Block, Inc., Kansas City, Mo., and TaxACT®, available from $2^{nd}$ Story Software, Inc. TurboTax®, ProSeries® and Lacerte® are registered trademarks of Intuit Inc., and TaxACT® is a registered trademark of $2^{nd}$ Story Software, Inc. For ease of explanation, reference is made to a first tax preparation application, such as TurboTax®, as the first financial application 412, but embodiments may be included within, utilized with, or adapted for use with, other financial applications 412 including, but not limited to, personal finance, accounting and tax preparation applications identified above.

Figure 4:
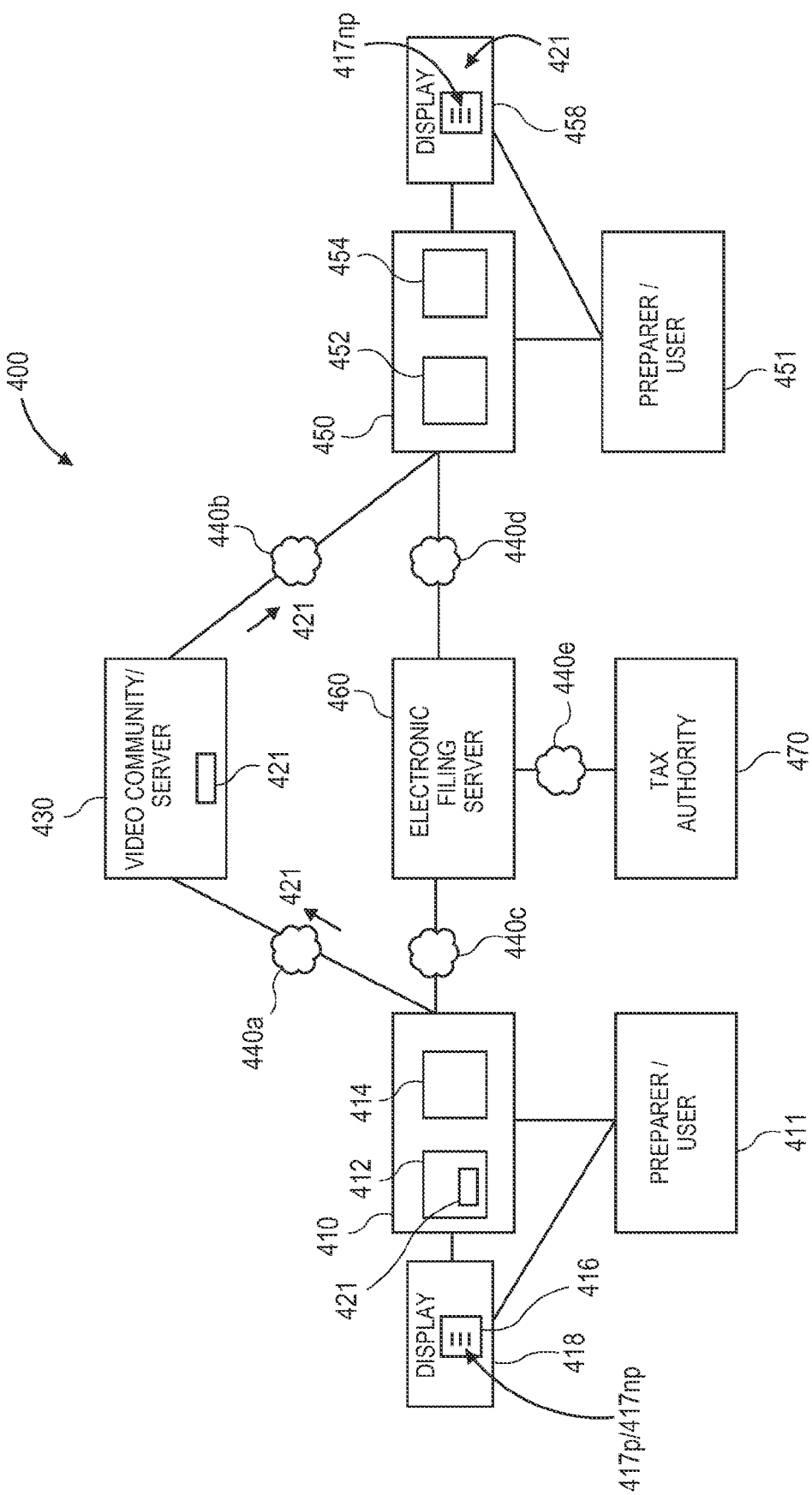
FIG. 4 is block diagram of a system constructed according to one embodiment for generating a video and displaying selected portions of the video to prevent a person from viewing private information of another person.

As generally illustrated in FIG. 4, at stage 310, one or more interview screens, pages or forms 416 (generally referred to as a first interview screen 416) generated by the first tax preparation application 412 are displayed on a monitor 418 of the first computer 410. At stage 315, data 417 related to the first person 411 is entered into the interview screen 416. The first person 411 may enter data 417 related to himself or herself (e.g., when using TurboTax®), or an accountant may enter data 417 related to the first person 411 (e.g., when using ProSeries®) on behalf of the first person 411. In both cases, data 417 that is entered is related to the first person 411 and may include non-private data 417np and/or private data 417p. Further, data 417 related to the first person 411, whether entered by the first person 411 or by his or her accountant, may involve the first person 411 and/or another person whose information is required in the electronic tax return such as a relative or a dependent of the first person 411 or another person included within the tax return 414 of the first person 411. Such data is generally referred to as data 417 related to the first person 411.

The data 417 may be defined or classified as non-private data 417np or private data 417p depending on the first tax preparation application 412 utilized and/or preferences of the first person 411. For example, the first tax preparation application 412 may be programmed to identify or tag certain data 417 or fields for data 417 as private 417p or non-private 417np. The first person 411 may also select which types of data 417 should be classified as private 417p and non-private 417np.

According to one embodiment, private data 417p is generally be considered to be personal or financial data that is normally maintained as secret or that is subject to minimal public disclosure (if any) in order to protect against misappropriation of such private data, e.g., to prevent identity theft. According to one embodiment, private data 417p related to the first person 411 includes private or sensitive personal information that uniquely identifies the first person 411. Examples of private data 417p include the first person's 411 name (or portion thereof, e.g., a last name), phone number, address, and social security number. Private data 417 related to the first person 411 may also include these types of private data of another person, relative or dependent that is included within the electronic tax return 414 of the first person 411 such as a child, a spouse, or other relative or dependent.

Private data 417p may also be defined as or include Personally Identifiable Information (PII), examples of which include of data 417p for which there are restrictions or laws against disclosure, e.g., as specified by certain accounting and tax codes and regulations such as the Sarbanes-Oxley Act and Title 26 of the United States Code, e.g., Section 7126, which forbids disclosure of taxpayer data.

According to another embodiment, private data 417p related to the first person 411 includes private or sensitive financial data such as wages and investment income of the first person 411 or someone related to the first person 411. Examples of non-private or less sensitive information may include whether the first person 411 is male or female, married, single or divorced, legally blind, in the military, etc. It should be understood that whether data 417 related to the first person 411 is classified as private 417p or non-private 417np may vary depending on the tax preparation application 412 utilized and preferences of the first person 411.

In one embodiment, a tax preparation application 412 may be programmed to define certain types of data 417 as private. In another embodiment, the first person 411 may indicate that certain types of data 417 are private. The first person 411 may also indicate a privacy level of data, e.g., on a scale of 1-10, and data 417 that is ranked about a certain number, e.g., 5, is classified as private data 417p. For example, a first person 411 may indicate that a social security number has a privacy ranking of 10 and is classified as private 417p, whereas an occupation field has a lower ranking, e.g., 3, and is classified as non-private. For ease of explanation, reference is made to private data 417p generally.

At stage 320, a first video 421 of the first interview screen 416 is generated. In the embodiment illustrated in FIG. 4 and with further reference to FIG. 5, the first video 421 is generated by execution of a video processing, capture or generation tool or element 502 (generally referred to as video capture element 502) on the first computer 410. In the illustrated embodiment, the video capture element 502 is a component of the tax preparation application 412, but it may also be a separate program. The first video 421 that is generated using the video capture element 502 may also be stored in various locations on the first computer 410 or associated media or memory. Thus, FIG. 5 is intended to generally illustrate that the first video 421 is generated by the video capture element 502, which is a part of or associated with the tax preparation application 412.

According to one embodiment, the first video 421 is a video of a static interview screen 416. According to another embodiment, the first video 421 is a video of two or more interview screens 416. According to a further embodiment, the first video 421 is a video of a dynamic or active interview screen, form or screen shot 416 in which the first person 411 shows how changes are made to the interview screen 416, e.g., by entering or deleting data, checking or unchecking boxes and/or moving a cursor or pointer to navigate the interview screen 416. According to a further embodiment, the first video 421 is a video of multiple dynamic or active interview screens 416 in which the first person 411 shows how changes are made to the interview screen 416, e.g., by entering or deleting data, checking or unchecking boxes and/or moving a mouse to navigate between different screens, pages or windows. For example, the first video 411 may show the interview screen 416, the first person 411 manipulating data and/or a cursor or pointer while verbally expressing a question or comment, and then advancing to the next interview screen 416 at which time the first person 411 can continue to verbally express the question or comment in conjunction with the interview screen 416 that is currently displayed. Thus, it should be understood that the first video 421 may include different numbers and types of interview screens 416, some, none or all of which may include verbal remarks by the first person 411, and some, none or all of which may include other action initiated by the first person 411.

At stage 325, private information 417p of or related to the first person 411 is blurred, masked, hidden or covered during or after generation of the first video 421 such that it is excluded from the first video 421. Although FIG. 3 shows blurring or masking of private data 417 as occurring after the first video 421 is generated, blurring or masking of private data 417p may also be performed in real time during generation of the first video 421.

Figure 5:
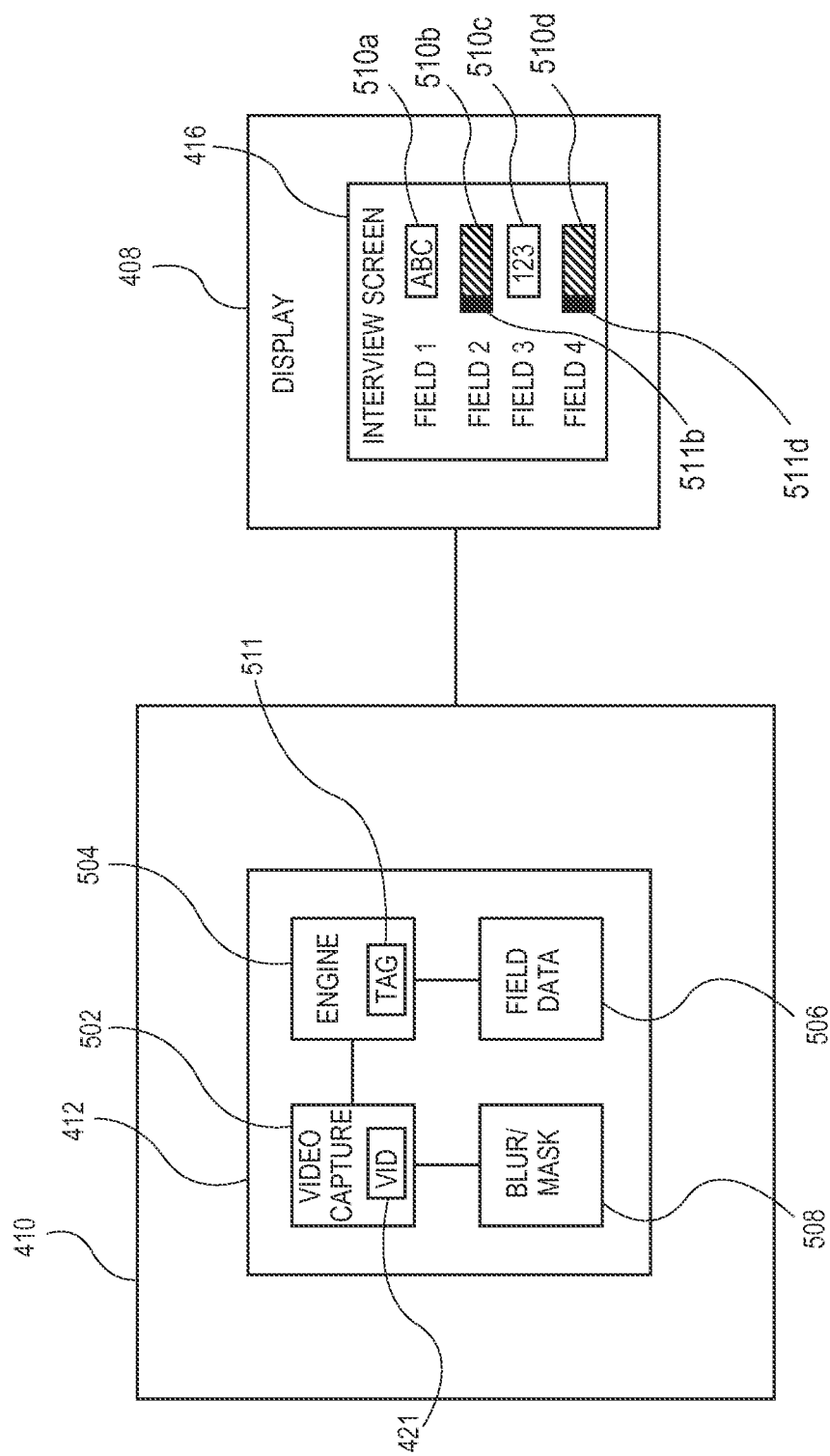
FIG. 5 generally illustrates components of a tax preparation application for generating a video having blurred or masked portions such that a person viewing the video cannot view blurred or masked private information of another person.

For this purpose, referring to FIG. 5, an engine 504 of the first tax preparation application 412, e.g., the engine 504 a TurboTax® tax preparation application, accesses, stores or receives data 506 related to pre-determined locations, shapes and/or dimensions of fields 510a-d (generally 510) of data 417a-d (generally 417) that are internally marked, tagged, labeled or otherwise identified as private 417p. According to one embodiment, private data 417p or associated fields 510 for private data 417p are tagged or marked using software, e.g., with a flag such as a binary flag, which indicates whether data 417 is private 417p or non-private 417np. Multiple flags may also be utilized. The first person 411 may also select which data 417 or fields 510 should be tagged as private 417p or provide input (e.g., by ranking data) for this purpose. For ease of explanation, reference is made generally to tagging or marking data or a field as private 417p. FIG. 5 illustrates software tags 511 within the engine 504, but tags 511 may also be stored in memory or within another element of the tax preparation application 412.

According to one embodiment, the engine 504 is a part of the TurboTax® tax preparation application 412 that, for example, defines tax forms and the relationships among tax forms. The engine 504 may also describe how each screen 416 should be laid out on the display 418 and how the screen 416 should appear when printed. In the embodiment illustrated in FIG. 5, the interview screen 416 includes four fields 510a-d (generally 510). Certain fields 510b and 510d are tagged 511b, 511d (generally 511) as having respective private data 417p (which is shown as being blurred or masked in FIG. 5). While these software tags 511 are not actually displayed on the monitor 418 (since they are internal software tags 511 within the engine 504 of the first tax preparation application 412), they are shown in FIG. 5 to generally illustrate that certain fields 510 are marked 511 to indicate that the field is for private data 417p. One or more other fields 510a and 510c are not tagged in this manner, or are tagged using software to indicate that the fields 510a, 510c are for non-private data 417np. The non-private data 417np is visible and generally illustrated in FIG. 5 as "ABC" and "123". Data 506 related to the locations, shapes and/or dimensions of tagged private data fields 510b and 510d is provided to the video capture element 502 via the engine 504. The video capture element 502 generates the first video 421 and applies a blur or mask element or algorithm 508 to the tagged private data fields 510b and 510d during or after generation of the first video 421, i.e., within the locations of the first video 421 identified by the private field data 506 related to the tagged private data fields 510b and 510d.

Figure 6:
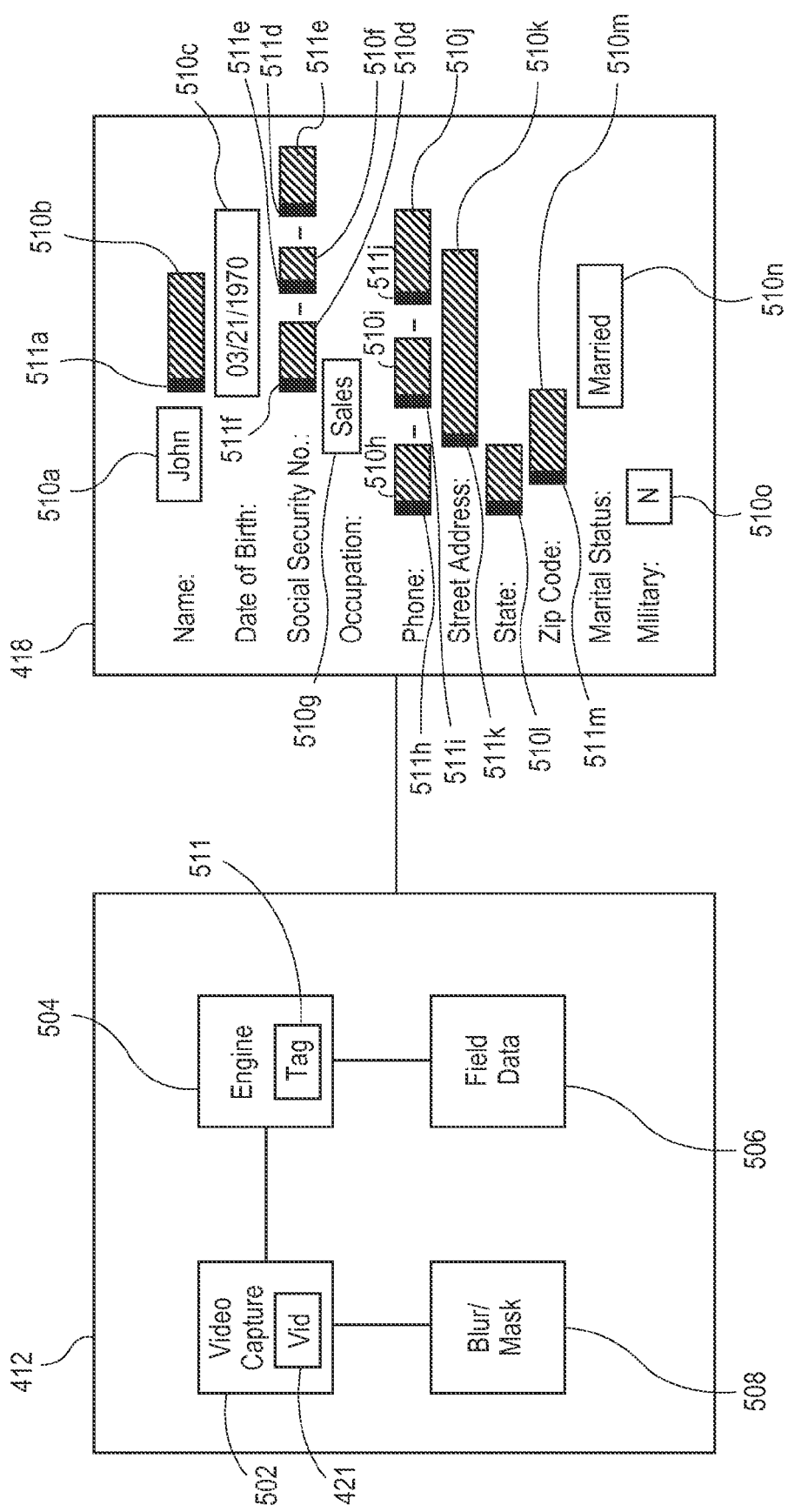
FIG. 6 is a more detailed example illustrating how a video is generated such that a person can view non-private information but not private information such as a social security number of another person.

FIG. 6 provides a more detailed example in which system components illustrated in FIG. 5 are applied to an interview screen 416 that includes the following fields: non-private first name 510a, private last name 510b, non-private date of birth 510c, private social security number fields 510d-f, non-private occupation field 510g, private telephone number fields 510h j, private address field 510k, private state field 510l, private zip code field 510m, non-private marital status field 510n and non-private military field 5100. Similar to the fields illustrated in FIG. 5, private data fields 510b, 510d-f, 510h-j and 510l-m are tagged 511a, 511d-f, 511h-j and 511 l-m by software as having respective private data 417p, whereas other fields 510a, 510c, 510g, 510n-o are not so tagged or are tagged as having respective non-private data 417np. As described above, the software tags 511 are not actually displayed on the monitor 418 (since they are internal software tags 511 within the engine 504), but are shown in FIG. 6 to generally illustrate that certain fields 510 are tagged 511 to indicate that the field is for private data 417p.

Data 506 related to the location, shape and/or dimensions of the private data fields 510b, 510d-f, 510h-j and 510l-m is provided to the video capture element 502. The video capture element 502 generates the first video 421 and applies a blur or mask element or algorithm 508 to the tagged private data fields 511a, 511d-f, 511h-j and 511 l-m during or after generation of the first video 421, i.e., within the locations of the first video 421 identified by the private field data 506 related to the tagged private data fields 511a, 511d-f, 511h-j and 511 l-m.

As shown in FIG. 6, data or information may be represented as one or multiple elements, e.g., one or multiple words or strings of alpha-numeric characters. For example, a name, a social security number and a telephone number are illustrated as having multiple fields 510 for different segments or terms, e.g., for first and last name, or for different groups of numbers. In other embodiments, such groups of terms or numbers may be defined to be a single field 510, e.g., similar to the date of birth field 510c illustrated in FIG. 6. Thus, it should be understood that information may be included within one or multiple fields 510 depending on the field 510 structure that is employed, and FIGS. 5 and 6 are provided as general examples of how embodiments may be implemented.

Figure 7:
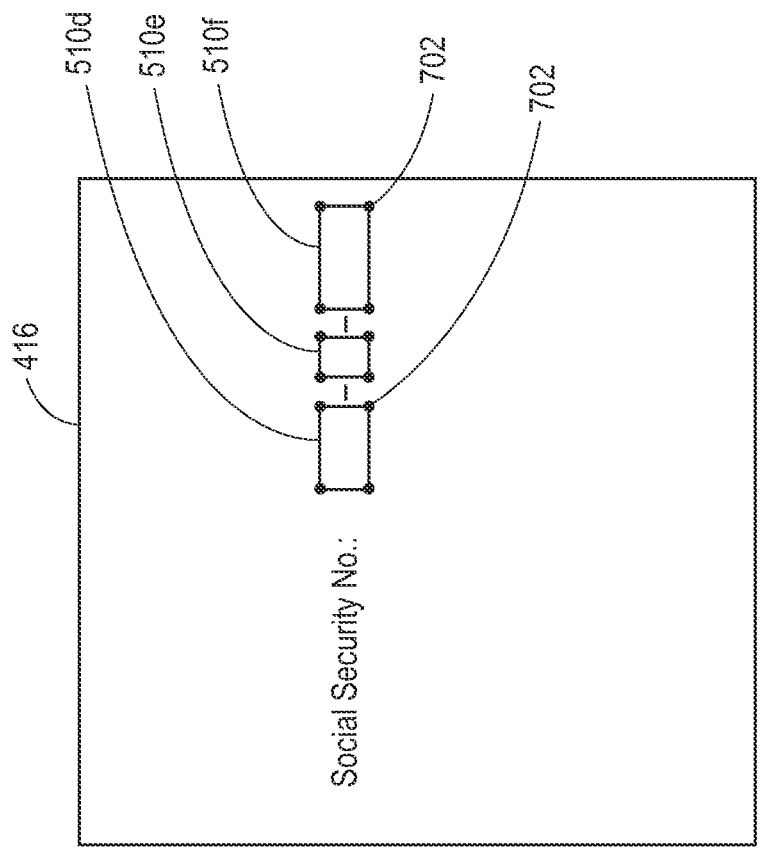
FIG. 7 generally illustrates a location of a private data field within an interview screen or frame that can be used to determine which fields will be blurred or masked.
Figure 8:
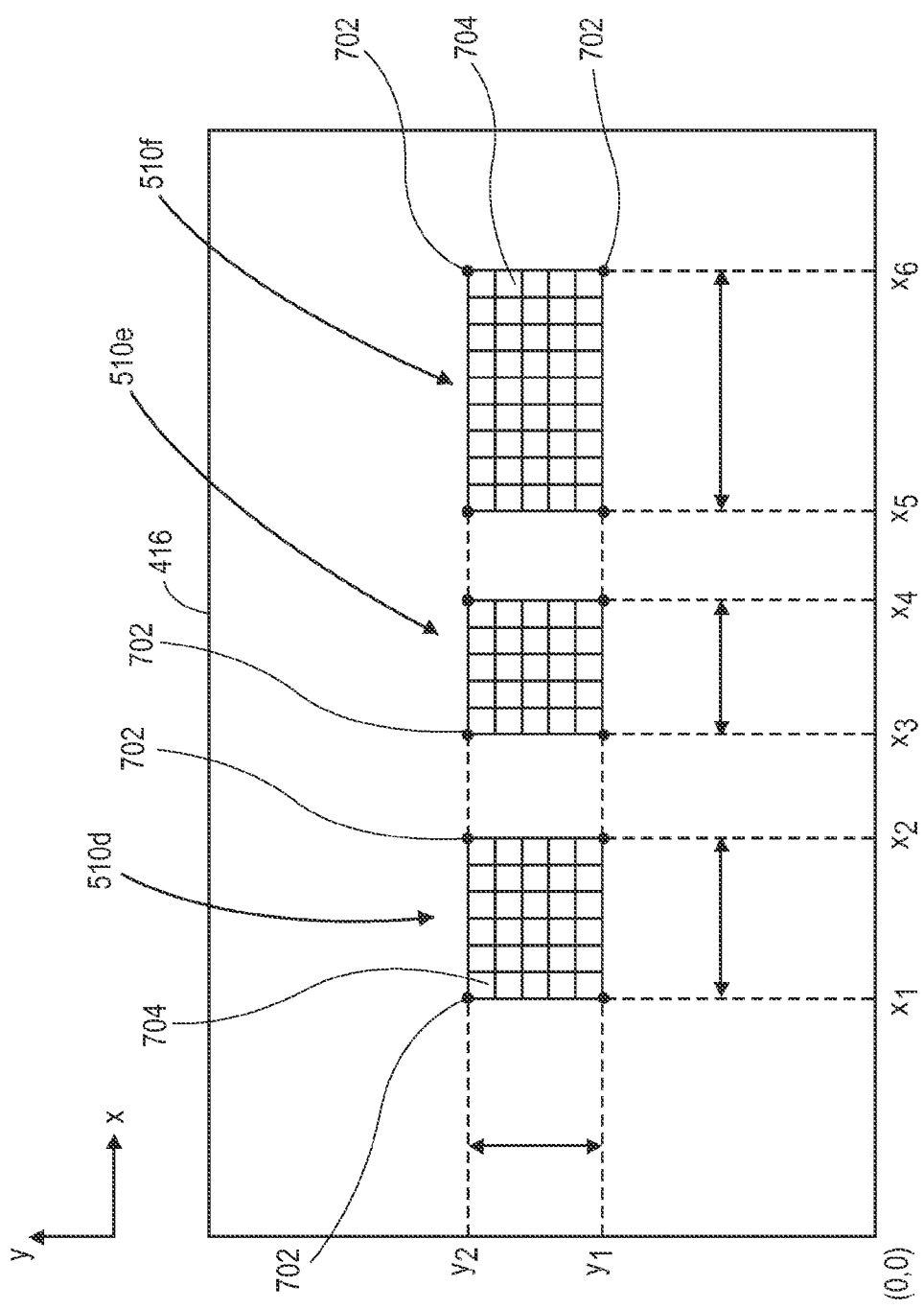
FIG. 8 illustrates in further detail how a location of a private data field within an interview screen or frame can be determined relative to a coordinate system or reference.

According to one embodiment, with reference to FIGS. 6-8, data 506 of the location, shape and/or dimensions of a tagged 511 private data field 510 containing private or sensitive information 417p relative to the screen 416 or other fields 510 within a frame of a video 421 are known. The blur or masking element 508 is applied to these tagged 511 fields. FIGS. 7-8 illustrate one example involving private social security number fields 510d-f (as shown in FIG. 6) and how the location, shape and/or size (width and height) of these private data fields 510d-f and other fields 510 for private data 417p within the screen 416 or frame can be determined, e.g., relative to other content and/or relative to reference point within an x-y coordinate system. Such embodiments may be useful when private data fields 510 appear at the same location within an interview screen 416 or frame, or are the same shape, size and location within the interview screen 416 or frame relative to other fields or content that is displayed.

For this purpose, field location, shape and/or dimension data 506 may identify one or more or all of the corner or boundary points 702 of each marked field 510, the height or y coordinates of each marked field 510, and the width or x coordinates of each marked field 510. The tax preparation application engine 504 provides the field data 506 to the video capture element 502, which generates or records the first video 421 and applies the blur or mask algorithm 508 to one or more pixels or segments 704 of the marked private data fields 510 defined by the boundaries or dimensions determined by the data 506. In other words, a video includes a plurality of frames (still video images), which have one or more fields 510. One or more fields 510 having private data 417p are blurred or masked based on the location 506 of these fields 510 within a frame or screen. In this manner, the first video 421 generated by the video capture element 502 contains non-private data 417np but not private data 417p that is blurred or masked 508 according to embodiments.

In certain embodiments, referring again to FIGS. 3-4, at stage 330, the first person 411 selects an on-line community or technical support forum (generally referred to as on-line community and illustrated as server 430) to which the first video 421 is submitted over a network 440a at stage 335. The network 440a and other networks discussed herein may be various suitable networks including, for example, a Local Area Network (LAN), a Wide Area Network (WAN), a wireless network, and other suitable networks. For ease of explanation, reference is made to a network generally, but various networks may be utilized, and other networks discussed herein may be the same or different type of network.

FIG. 4 illustrates an embodiment in which the first video 421 transmitted from the first computer 410 to the server 430 that is shared with other people who may or may not utilize a financial application. FIG. 4 illustrates one embodiment in which a second user or member 451 utilizes a second computer 450 and a second tax preparation application 452 for preparing a second electronic tax return 454. However, embodiments may involve, two, three, four and other numbers of on-line community members, and the illustrated embodiment involving two users 411, 451 is provided for purposes of illustration and ease of explanation.

According to one embodiment, the on-line community or server 430 is a community associated with the tax preparation such as TurboTax®, e.g., Live Community that is configured to allow the first person 411 to generate and transmit a video 421 rather than only text or written communication. Embodiments may also involve other types of on-line video communities and video sharing forums such as YouTube®.

Figure 9:
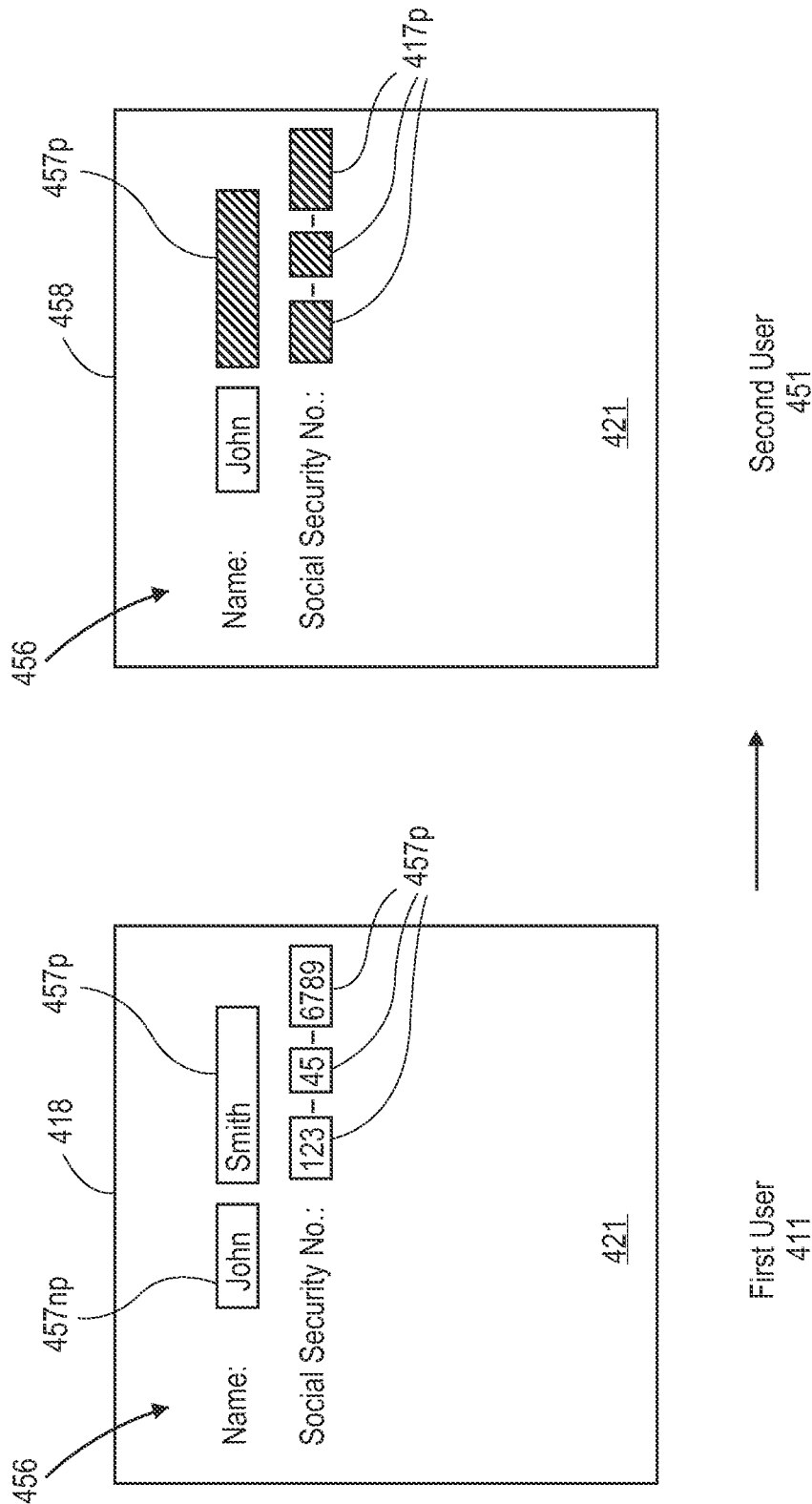
FIG. 9 generally illustrates how a video is generated by a first person such that non-private information but not private information related to the first person can be viewed by a second person.

At stage 340, the first video 421 is accessed or downloaded from the video or community server 430 by the second person 451 who uses the second computer 450 via a network 440b. The first video 421 is displayed on a second display 458 and viewed by the second person 451. As discussed above, the first video 421 is displayed to the second person 451, but the private data 417p related to the first person 411 is blurred or masked as a result of application of the blur or mask element 508. Thus, as shown in FIGS. 4 and 9, the second person 451 is able to view the first video 421 having only the non-private information 417np of the first person 411, but not the private information 417p since the private information 417p is masked or blurred.

Although FIG. 4 illustrates an embodiment involving a second person 451 who utilizes a second financial application 452, in other embodiments, the second person 451 using the second computer 450 does not utilize a second financial application 452. Instead, the second person 451 may view the first video 421 using a web browser that executes on the second computer 450 and/or a video program such as YouTube®. Thus, FIG. 4 is provided to illustrate one example of how embodiments may be implemented.

After viewing the first video 421, the second user 451 may respond to the first person 411 with a typed or e-mail response. In an alternative embodiment, referring to FIGS. 10-12, the second person 451 may generate his or her own video 422 (referred to as a "second video" 422) of one or more interview screens, pages or forms 456 (generally referred to as a second interview screen 456) generated by the second tax preparation application 452, and send the second video 422 to the first person 411. The second interview screen 456 may include non-private data 457np and private data 457p (generally data 457) related to the second person 451. Data 457 of or related to the second person 451 may be the same types of data as described above with reference to the first person 411. According to one embodiment, system and method embodiments described with reference to FIGS. 3-9 for generating the first video 421 and blurring or making private information 417p related to the first person 411 are applied to generate the second video 422. In this manner, private information 457p of the second person 451 is also blurred or masked such that the private information 457p is excluded from the second video 422. Blurring or masking of the private information 457 can be performed during or after generating of the second video 422. In this manner, with embodiments, each person 411, 451 can view a video 421, 422 generated by the other, but neither person 411, 451 can view private data 417p, 457p of the other person since the respective private data 417p, 457p of the respective persons 411, 451 is masked or blurred according to embodiments.

Figure 10:
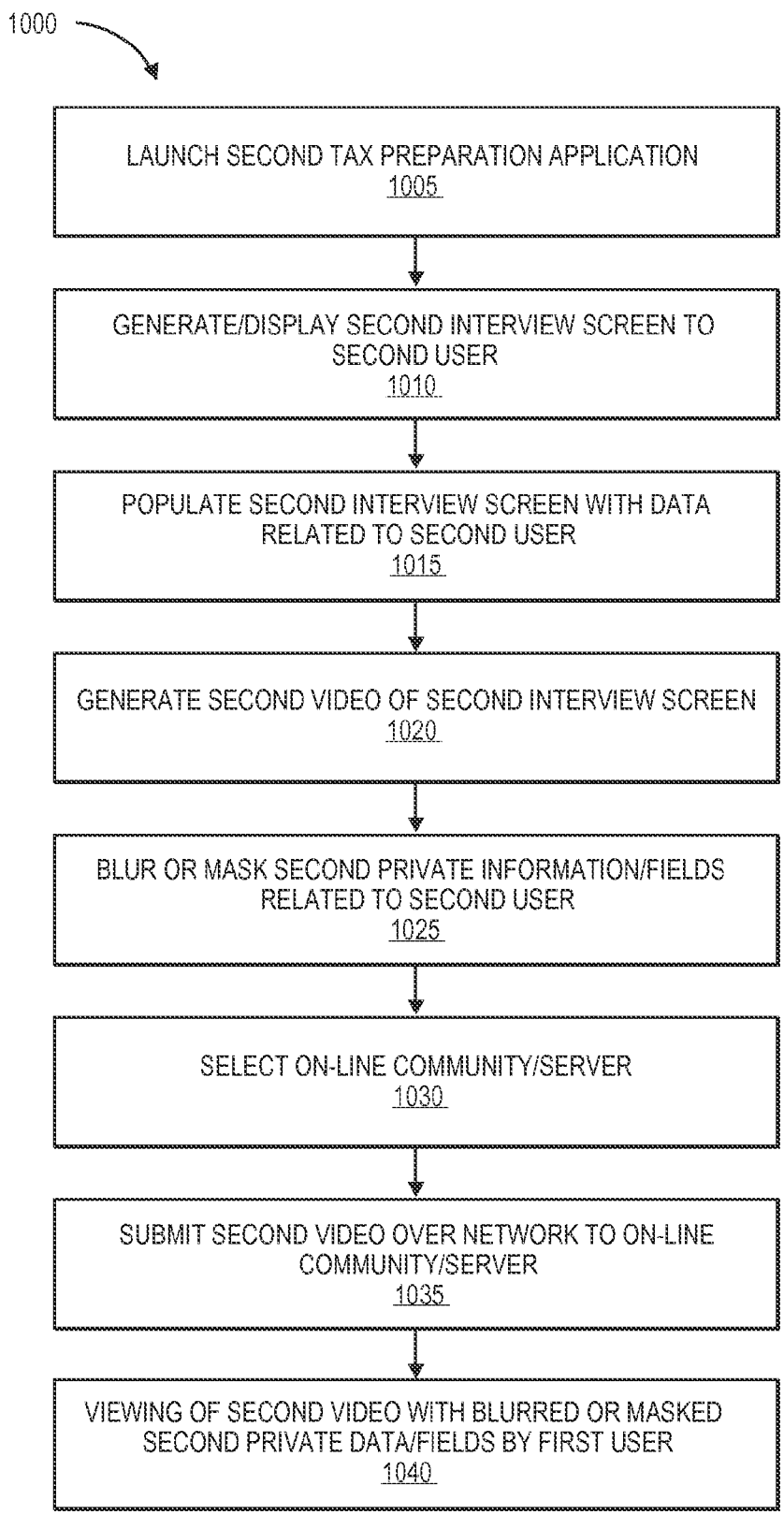
FIG. 10 is a flow chart of one embodiment of a method for generating a video and selectively displaying video information.
Figure 11:
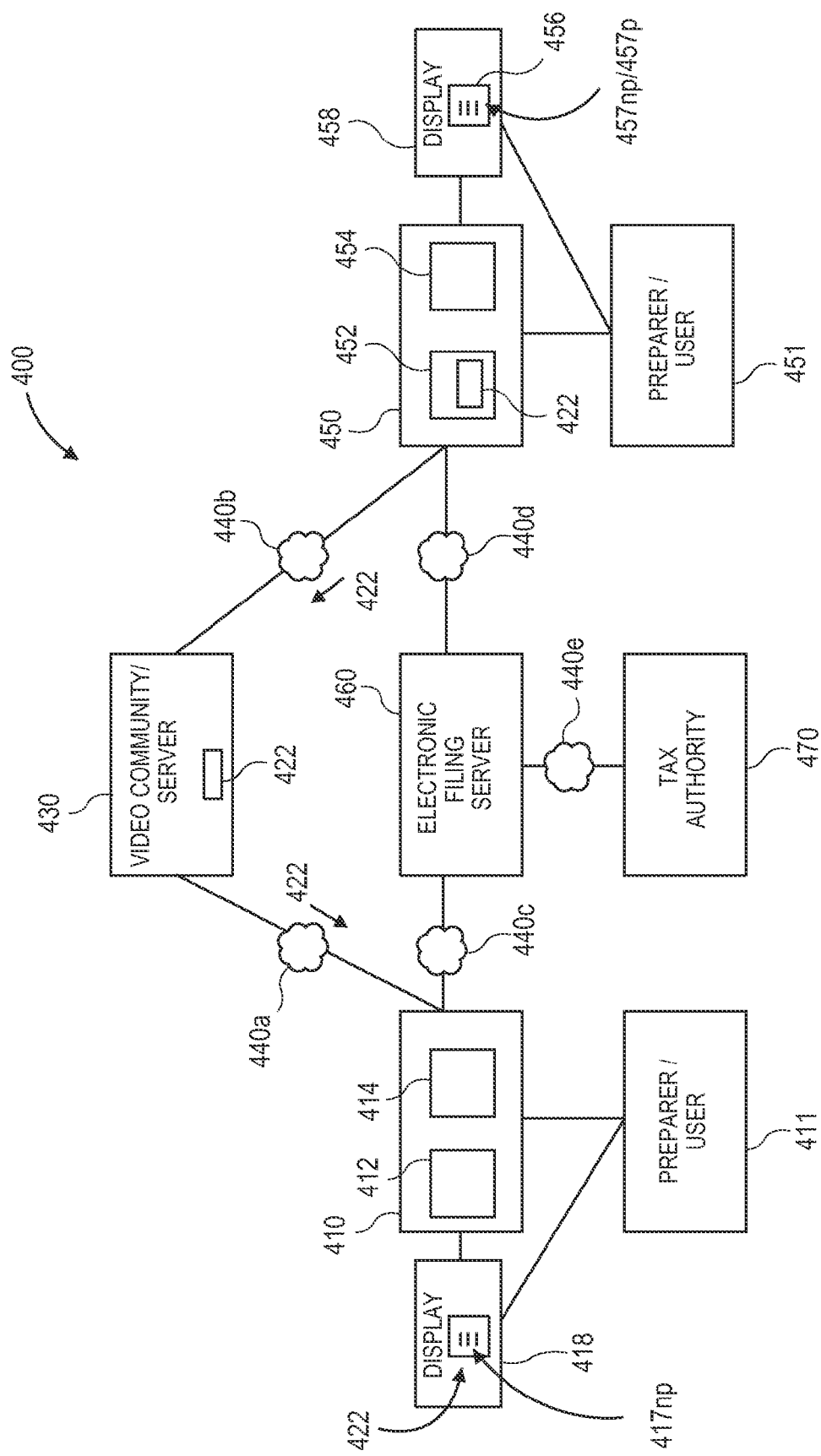
FIG. 11 illustrates a system constructed according to one embodiment for generating a second video related to a tax preparation application and selectively displaying video information, wherein a first person views a video submitted by a second person in response to a first video submitted by the first person, and private information of the second person is masked or blurred such that it is not visible to the first person viewing the second video.
Figure 12:
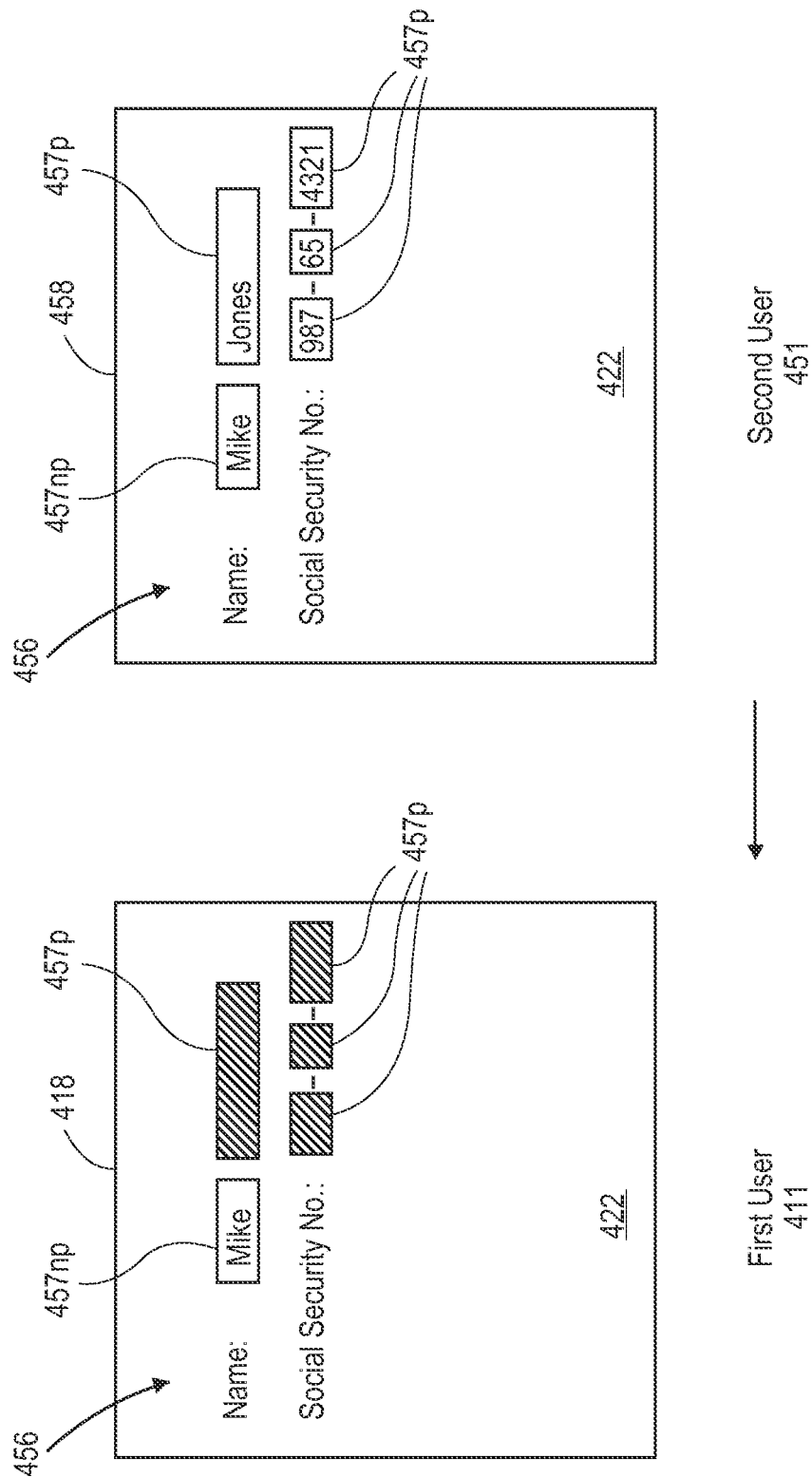
FIG. 12 generally illustrates how a second video generated by a second person in response to a first video submitted by a first person and having both private and non-private data can be viewed by the first person while blurring the second person's private data.

Thus, referring to FIG. 10 and with further reference to FIGS. 11 and 12, one embodiment of a method 1000 for generating and submitting a second video 422 to the first person 411 in response to the first video 421 presented by the first person 411 comprises launching or executing a second tax preparation application 452 on a second computer 450 at stage 1005, and generating one or more interview screens or forms 456 that are displayed on a second monitor 458 of the second computer 450 at stage 1010. At stage 1015, the second interview screen 45 is populated, e.g., by the second person 451 entering data 457 into the second interview screen 456. The data 457 may be non-private data 457np and/or private data 457p. At stage 1020, the second video 422 of one or more second interview screens 456 is generated, and a blur or mask element or algorithm (as described with reference to FIGS. 3-9 utilizing software tags) is applied to private data fields 457p of the second video 422 at stage 325, which may be during or after generation of the second video 422.

The second video 422 illustrated in FIG. 11 may be generated by execution of a second video processing, capture or generation element (as described with reference to FIGS. 3-9 and shown in FIG. 5), which may be a component of the second tax preparation application 452 and may be stored in various locations on the second computer 410 or associated media or memory. Thus, FIG. 11 is intended to generally illustrate that the second video 422 is generated, and the video capture element 502, the engine 504, private field data 506, blur or masking element 508 and tags 511 described with reference to the first video 421 may be utilized to generate the second video 422 and to mask, hide or blur private information 457p of the second person 451 to exclude this private information 457p from the second video 422. Therefore, descriptions of the components illustrated in FIG. 5 are not repeated.

At stage 1030, the second person 451 selects an on-line community or technical support forum (generally referred to as on-line community and illustrated as server 430) to which the second video 422 is submitted over a network 440b at stage 1035. At stage 1040, the second video 422 is accessed or downloaded from the video or community server 430 to the first computer 410 via a network 440a. As generally illustrated in FIG. 12, the second video 422 is displayed to the first person 411 while masking, blurring, hiding or covering the private data 457p related to the second person 451. Thus, with embodiments, the first person 411 may generate a first video 421, which can be transmitted to and viewed by the second person 451 while hiding, blurring or masking private data 417p of or related to the first person 411, and the second person 451 may generate a second video 422, which can be transmitted to and viewed by the first person 411 while hiding, blurring or masking private data 457p of or related to the second person 451. Embodiments may also be applied to other numbers of users.

FIGS. 13A-G illustrate screen shots and user interfaces that may be used to implement embodiments using Live Community (TurboTax®) that is configured for video and/or typed communications rather than only typed communication (as shown in FIGS. 1A-B). In the embodiment illustrated in FIG. 13A, the interface or window 1300 includes a data entry field 102 that allows a first person 411 to type a question or comment, which may be transmitted to the community 430 by pressing "Ask the Community" 104 as described with reference to FIGS. 1A-B. Other members or users of Live Community 430 may reply to the question with their own text response. With embodiments, the first person 411 can also generate a first video 421 by selecting "Record your question" 1302. As discussed above, embodiments can be implemented such that the private data 417p of the first person 411 is excluded from the first video 421 by masking or blurring 508 the private data 417p such that the private data 417p cannot be viewed by other persons or users of a financial application.

Figure 13A:
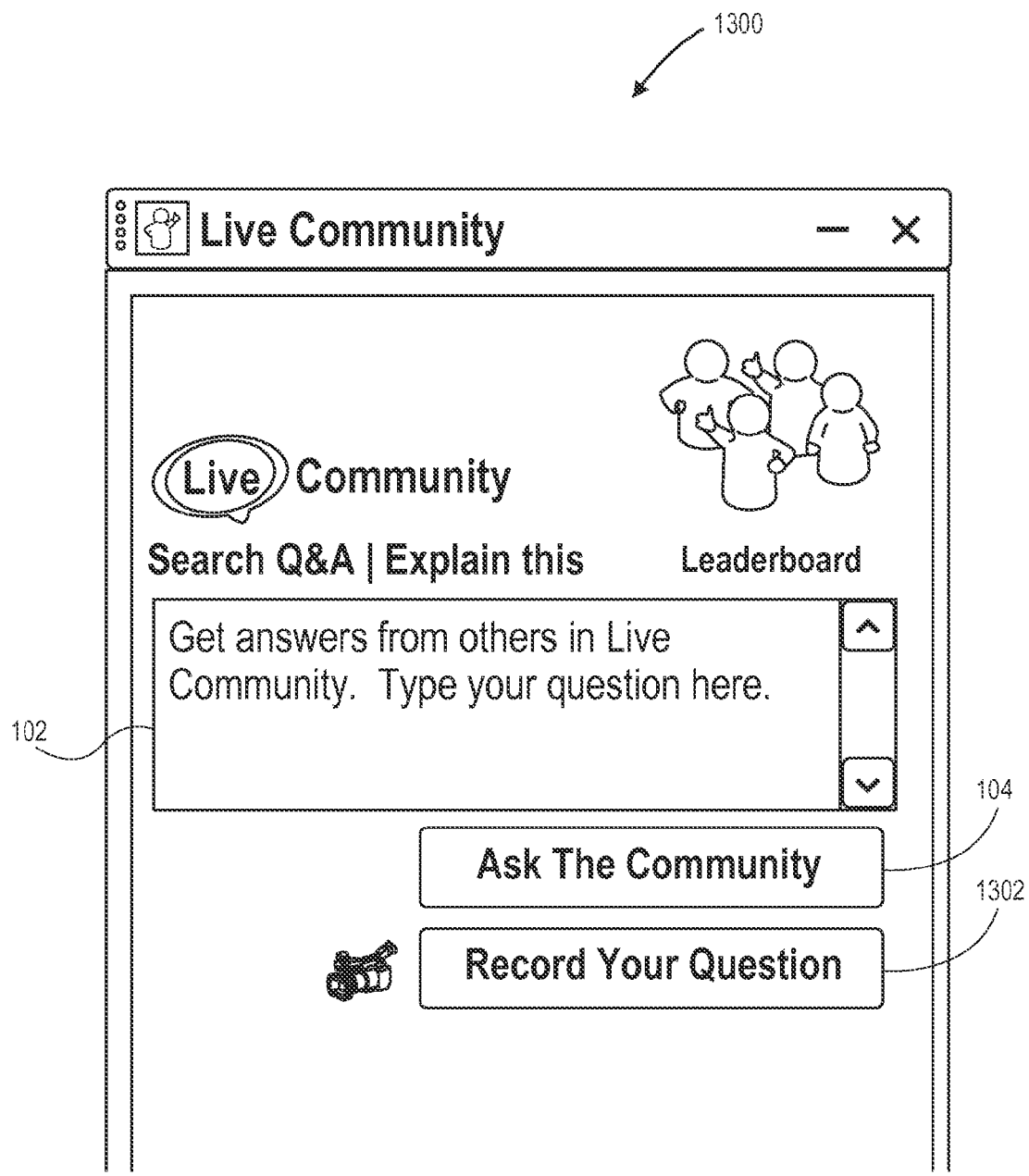
Figure 13B:
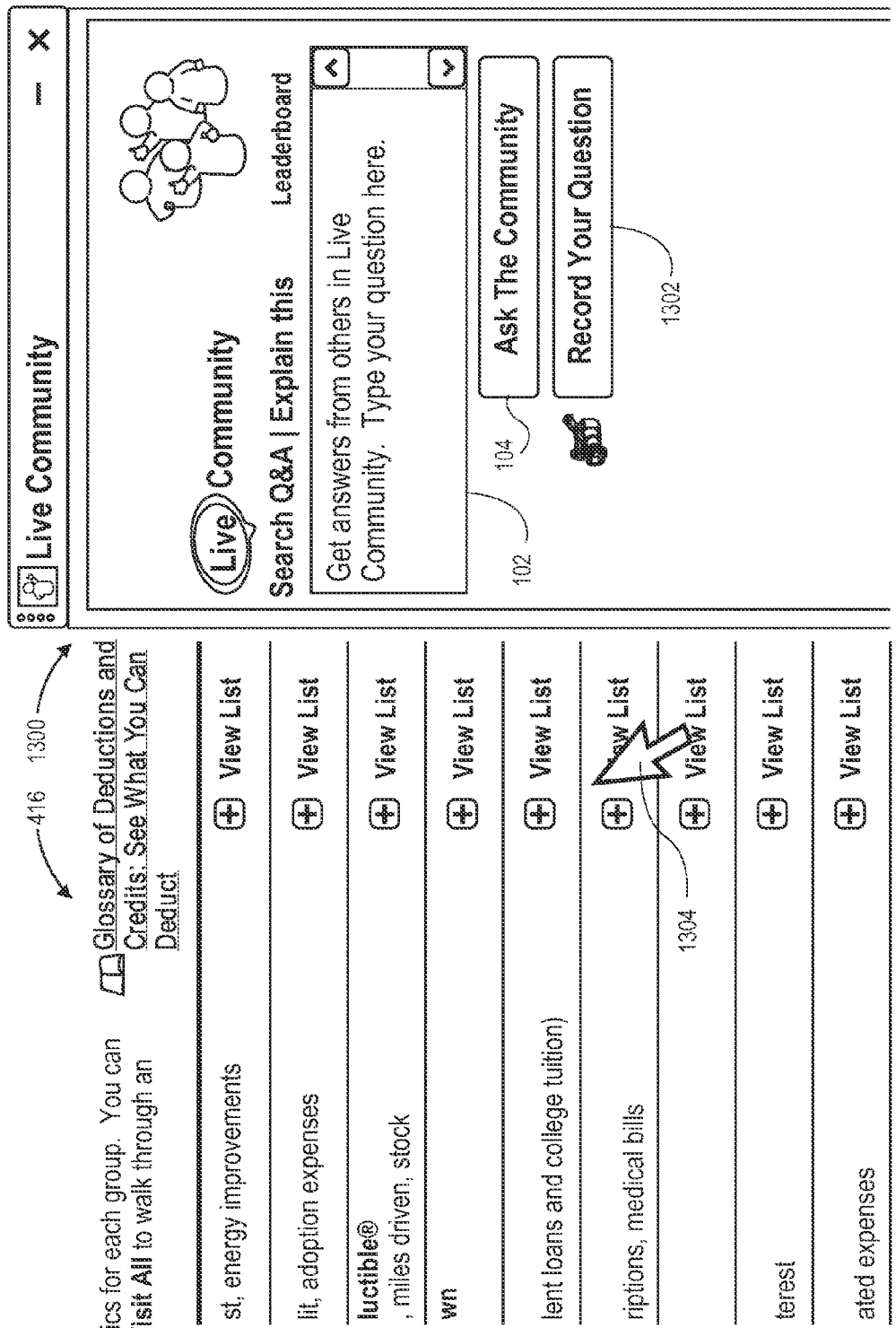

Referring to FIG. 13B, in the illustrated example, the first person 411 is preparing a first electronic tax return 414 on a first computer 410 by completing questions and navigating one or more interview screens 416. In this example, the first person 411 has a question or comment regarding the first interview screen 416 illustrated in FIG. 13B and launches the Live Community interface or window 1300. The first person 411 may move the cursor 1304 to "Record Your Question" 1302 to generate a video 121 with the question or comment.

Upon selecting "Record Your Question" 1302, the video capture element 502 (FIGS. 4-6) is executed to generate the first video 421 of one or more interview screens 416 (FIG. 13C). Another interface, window or icon (not illustrated in FIG. 13C) may be used to terminate generation of the first video 421. As discussed above with reference to FIGS. 2-9, the engine 504 of the first tax preparation application 412 accesses or receives field location, shape and/or dimension data 506 such that the first video 521 that is generated blurs or masks previously identified or tagged 511 private data fields 510.

Figure 13D:
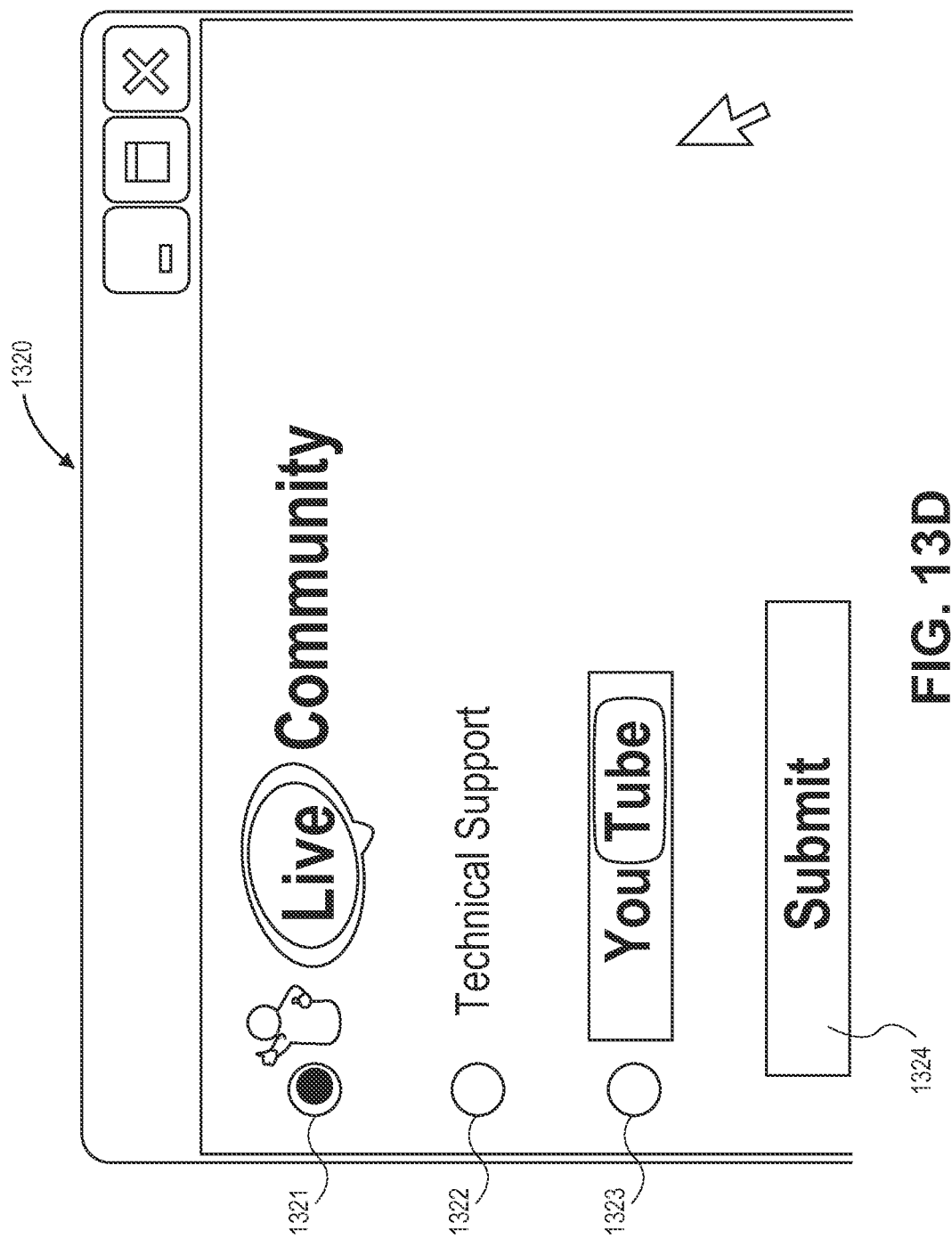

Referring to FIG. 13D, having generated the first video 421, the first person 411 is presented with an interface or screen 1320 that allows the first person 411 to select a video forum or community 430 to which the first video 421 will be posted. In the illustrated embodiment, the first person 411 may select Live Community 1321, Technical Support 1322 (e.g., TurboTax® or Intuit Technical support) or YouTube® 1323. Other video forums or communities may also be utilized, but these three video options are provided as illustrative examples of how embodiments may be implemented. In the illustrated embodiment, the first person 411 has selected Live Community 1321, and the first video 421 that was generated is posted to Live Community or server 430 by pressing "Submit" 1324. Other users or members of Live Community 430 may then access or download and view the first video 421.

Figure 13E:
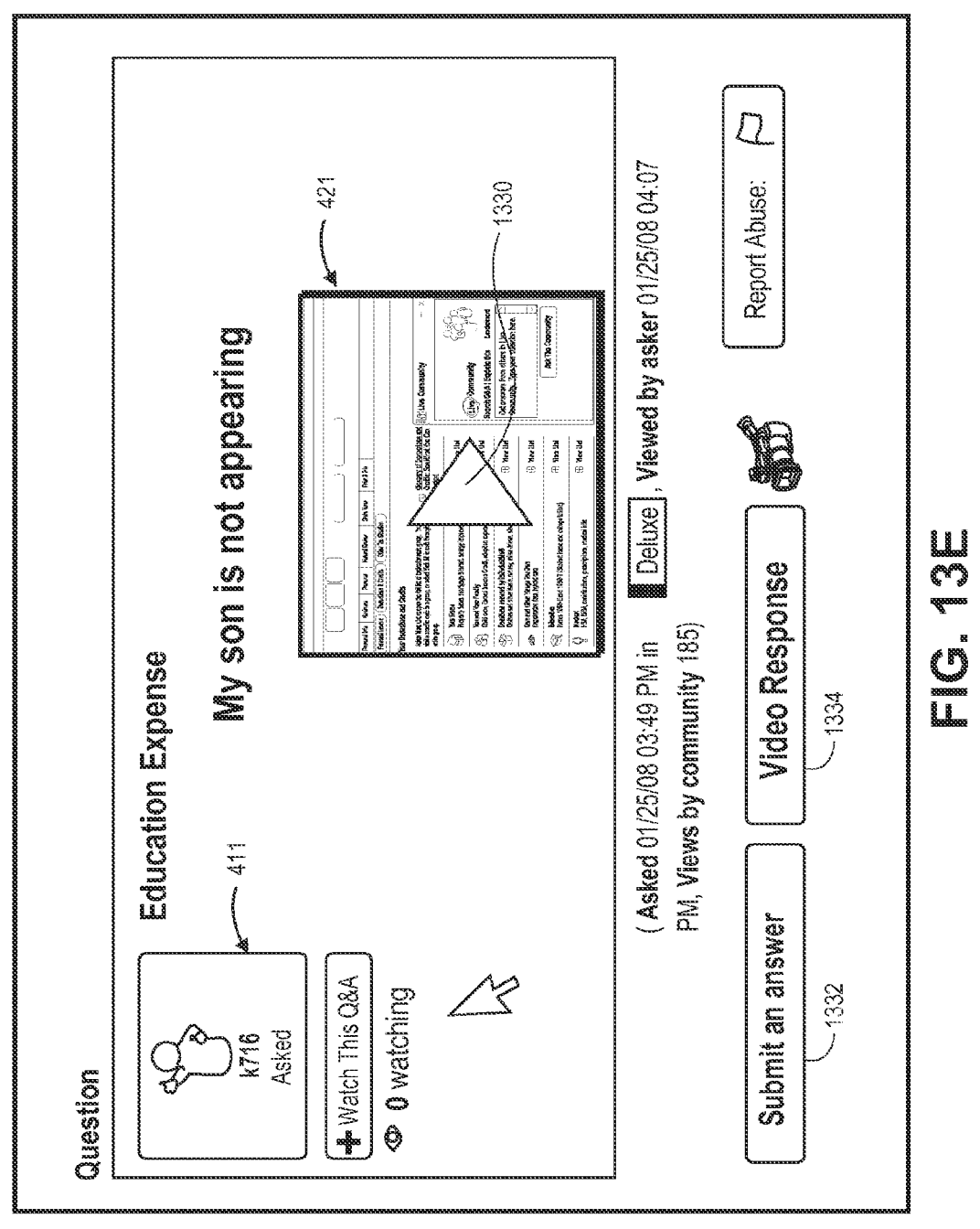

For example, referring to FIG. 13E, a second or other user 451 may download or access the first video 421 generated by a first person 411 (screen name "k716" in FIG. 13E) by pressing "play" 1330. Upon viewing the first video 421, the second person 451 can respond to the first person 411 by typing or e-mailing an answer and pressing "submit an answer" 1332 and/or generating his or her video (second video 422) by pressing "Video Response" 1334.

Figure 13F:
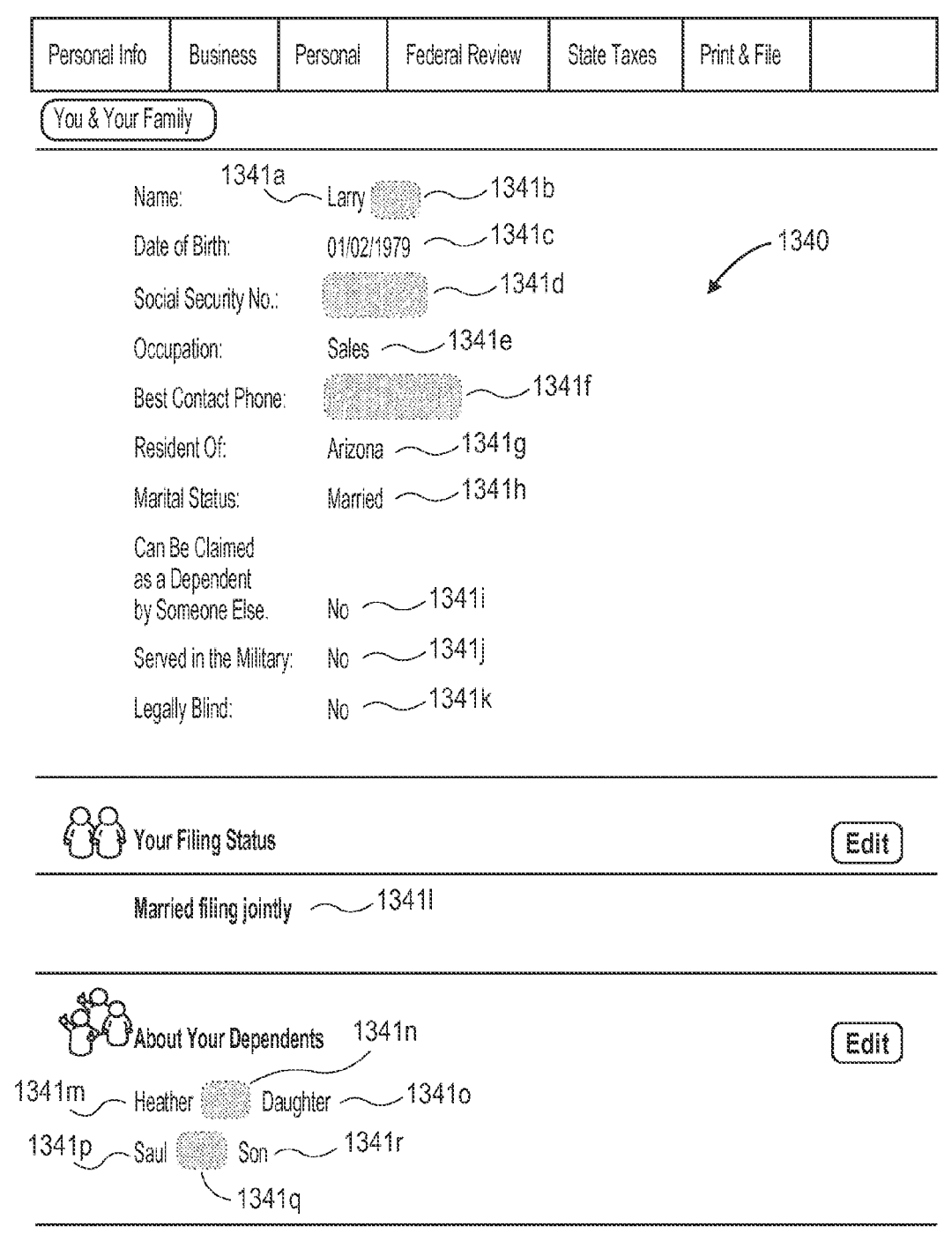

By pressing "Video Response" 1334, the second user 451 generates a second video 422 utilizing video capture, engine, field data and blur/mask elements as described above. In the illustrated embodiment, the second video 422 includes two interview screens 1340 and 1350 and accompanying verbal remarks by the second user 451 to address the question presented in the first video 421 generated by the first person 411. More particularly, as shown in FIGS. 13F-G, fields 1341b, 1341d, 1341f, 1341n and 1341q and fields 1351c and 1351f having private data 457p related to the second user 451 are masked or blurred, whereas other data fields 1341a, 1341c, 1341e, 1341g-m, 1341o, 1341p and 1341r and 1351a-b, and 1351 d-e are defined or selected as non-private 457np and not blurred or masked. The second video 422 is submitted to the community server 430, and when the second video 422 is downloaded or accessed and played by the first person 411, the first person 411 will only be able to see the non-private data 457np in fields 1341a, 1341c, 1341e, 1341g-m, 1341o, 1341p and 1341r and 1351a-b, and 1351d-e and not private data 457p in fields 1341b, 1341d, 1341f, 1341n and 1341q and fields 1351c and 1351f.

Referring again to FIGS. 4 and 11, when the first and second electronic tax returns 414, 454 are completed, they can be electronically filed with a tax authority 470, such as the Internal Revenue service, a state tax authority, or other tax collecting entity. The first and second computers 410, 450 are operably coupled to an electronic filing system or server 460 by respective networks 440c, 440d. The electronic filing system or server 460 serves as a "clearing house" for an electronic tax return 414, 454 that is ready to be transmitted via network 440e to the tax authority 470 and to process acknowledgements and other data received from the tax authority 470 and to route related information back to the tax preparer. One example of an electronic filing server 460 as shown in FIGS. 4 and 11 is a server of Intuit Inc., e.g., a server of the Intuit Electronic Filing Center. Other examples of electronic filing servers 460 include electronic filing servers utilized by TaxCut and TaxACT® tax return preparation applications.

While certain embodiments are described with reference to tax preparation applications that execute on a desktop computer, other embodiments may involve an on-line version of a tax preparation application or other financial application. For example, with reference to FIG. 14, in a system 1400 constructed according to another embodiment, the first person 411 who uses the first computer 410 that generates the first video 211 may do so by accessing an on-line tax preparation application 1414 on a website 1412. The website 1412 is hosted by a server 1410 and accessible through a network 440f utilizing a web browser 1420 on the first computer 410. The server 1410 is also operably coupled to the electronic filing server 460 via a network 440g. Examples of web browsers 1420 that may be utilized for this purpose include Internet Explorer®, Netscape Navigator®, Firefox® and Safari® browsers. Internet Explorer® is a registered trademark of Microsoft Corporation, Netscape Navigator® is a registered trademark of Netscape Communications Corporation, Firefox® is a registered trademark of Mozilla Foundation, and Safari® is a registered trademark of Apple, Inc.

Figure 15:
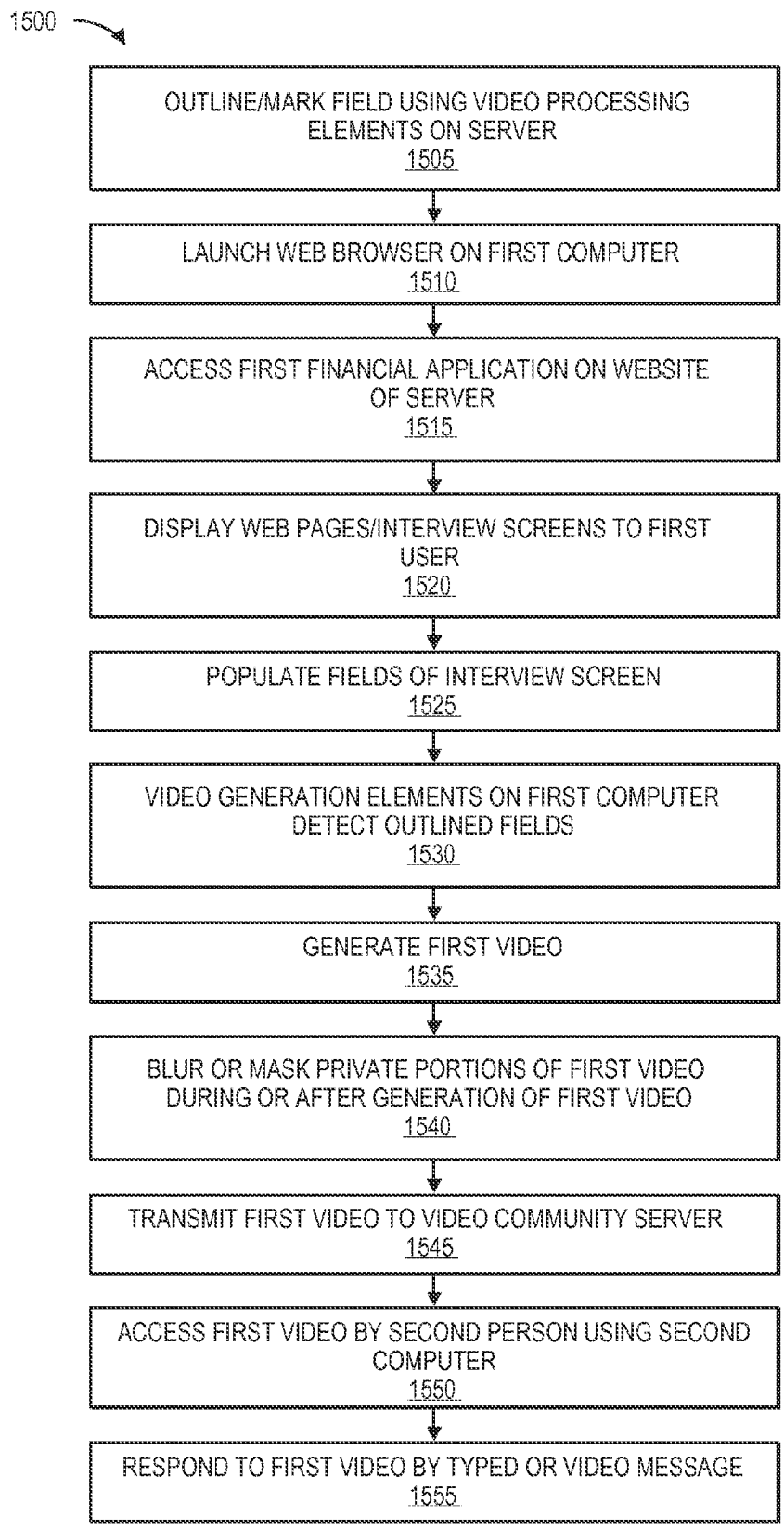
FIG. 15 is a flow chart of a further embodiment of a method for generating a video by outlining tagged fields for private data and identifying the outlined fields as fields that should be blurred or masked such that a person other than the person who generated the video cannot view private data.

With further reference to FIG. 15, a method 1500 for generating a video that excludes private data 417p of a person using an on-line financial application 1414 such that another person or user cannot view the private data involves blurring or masking private data 417p by physically marking, e.g., outlining, tagged field(s) 510 for private data 417p using a pre-determined color or other visible or identifying attribute. These attributes or visual differences are used to visually identify or detect the private data fields that should be blurred or masked, and then a first video 421 having private data 417p excluded by blurring or masking the outlined fields is sent to a community server 430. Thus, certain video processing elements apply an outline or other attribute to tagged private data fields, whereas other video processing or capture elements generate a video by blurring or masking the outlined fields.

More particularly, at stage 1505, video processing elements 1416 of the first tax preparation application 1414 on the server 1410 are operable or executable to change the way certain fields 510 for private data 417 will be displayed by physically marking or outlining data fields 510 tagged for private data 417p. The tagged private data fields may be identified or outlined with a pre-determined color, pattern, brightness, or other identifying attribute, e.g., by changing pixels of the outline or border of a tagged field 510. According to one embodiment, the video processing element 1416 is operable to outline a boundary or outer section of a private data field 510 in red to visually indicate that the tagged field 510 is for private data 417p. At stage 1510, the first person 411 utilizing the first computer 410 launches the web browser 1420 on the first computer 410. At stage 1515, the first person 411 accesses the on-line first tax preparation application 1414 residing on the website 1412 hosted by the server 1410 and that is used to prepare a first electronic tax return 414. At stage 1520, web pages of interview screens 416 are displayed 418 to the first person 411. The web pages that are displayed include the tagged fields 510 that are outlined in red as a result of application of video processing elements 1416 on the server 1410 to indicate that these fields 510 are for private data 417p.

At stage 1525, the first person 411 populates the fields of the interview screen 416 with data 417 that may include private data 417p and non-private data 417np. At stage 1530, video processing components 1417 of the browser 1420 on the first computer 410 are operable or executable to detect the red outline or other identifying attribute generated by the video processing element 1416 and displayed to the first person 411. At stage 1535, the video processing or capture element 1417 is operable or executable to generate the first video 421, and during or after generation of the first video 421, at stage 1540, a blur or mask (e.g., as shown in FIG. 5), is applied to the fields 510 outlined in red to blur or mask the private data 417p within these outlined fields 510. Thus, rather than blurring or masking private data fields based on their locations within a screen or frame, other embodiments detect an outline or other visual attribute to determine which fields should be blurred or masked.

In certain embodiments, at stage 1545, the first video 421 is transmitted from the first computer 410 to the video community server 430 via network 440a. If necessary, the video community server 430 may also include video processing components 1419 to selectively blur or mask data within the red outlined fields 510 of the video 421 generated by the video processing element 1417 on the first computer 410. Blurring or masking of the red outlined fields 510 may be done by the first computer 410, the server 430, or by another server operably coupled between the first computer 410 and the second computer 450, e.g., another server between the first computer 410 and the video community server 430 and the second computer 450. At stage 1550, a second person or a second user 421 of a second tax preparation application 452 can access and view the first video 421. For this purpose, the first video 421 can be viewed by the second person 451 using a known web browser and/or other video program on the second computer 450. In an alternative embodiment, the tax preparation application 452 may include its own video playing software 1457.

Figure 14:
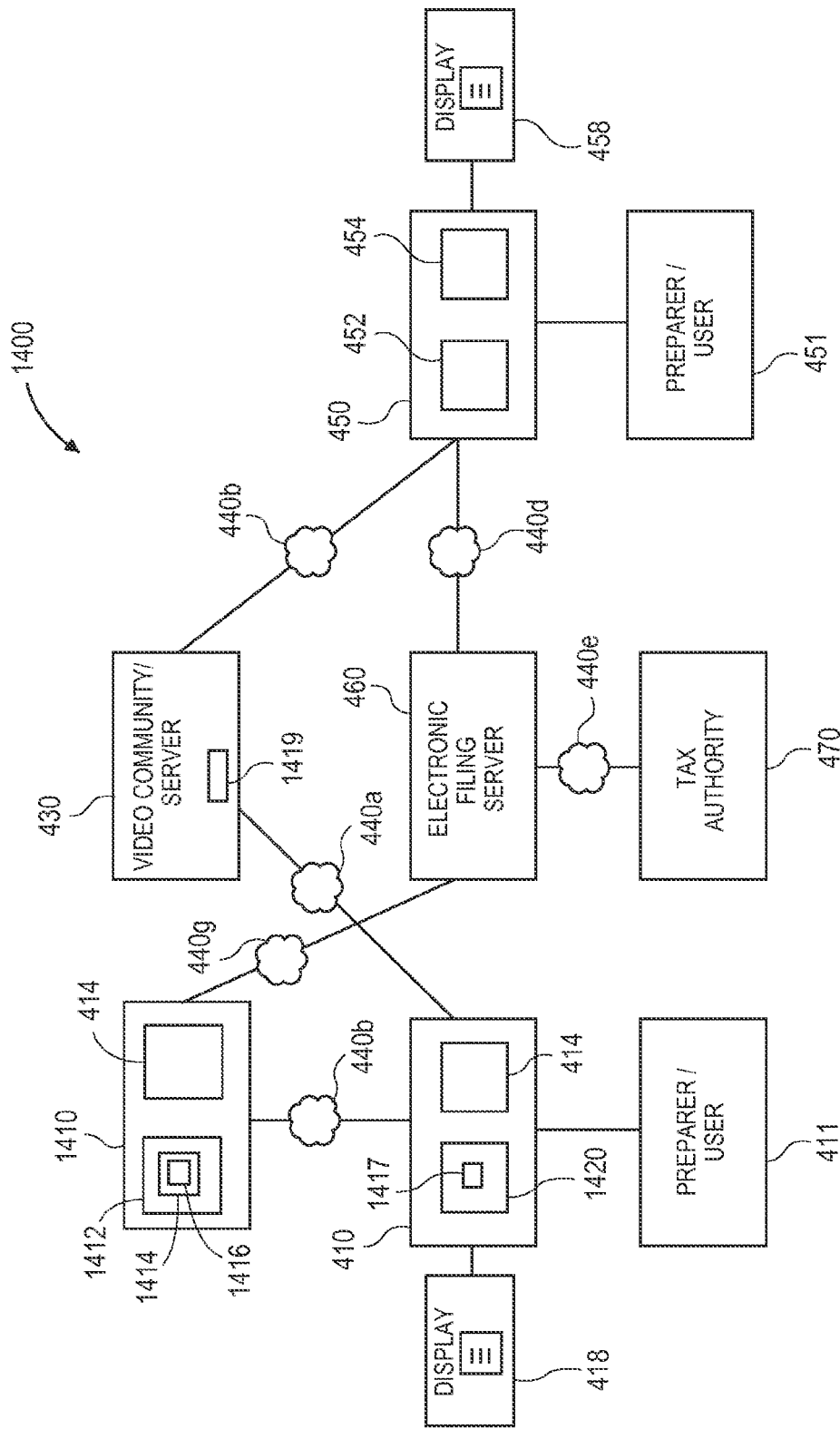
FIG. 14 illustrates a system constructed according to another embodiment in which a first person utilizes an on-line version of a tax preparation application.

At stage 1555, the second person 451 can respond to the first video 421 generated by the first person 411. According to one embodiment, stage 1555 involves the second person 451 submitting a typed or e-mail message to the first person 411, e.g., using a data entry box 102 as shown in FIG. 1A. This type of response can be made by a second person 451 that does not utilize a second financial application 452 or a second person 451 that uses a second financial application 452 (as shown in FIG. 14). According to another embodiment, stage 1555 involves the second person 451 generating a second video 422 using video processing or capture elements 1457 of a second tax preparation application 452 and submitting a video response to the first person 411, e.g., as described above with reference to FIGS. 10-12. In this embodiment, the second interview screen 456 may include non-private data 457np and private data 457p (generally data 457) related to the second person 451, and video processing elements 1457 are utilized to generate a second video 422 in which portions having private data 457p are excluded from the second video 422 by blurring or masking the private data 457. In this manner, each person 411, 451 can view a video 421, 422 generated by the other, but neither person 411, 451 can view private data 417p, 457p of the other person since the private data 417p, 457p of the users 411, 451 is masked or blurred according to embodiments.

Figure 16:
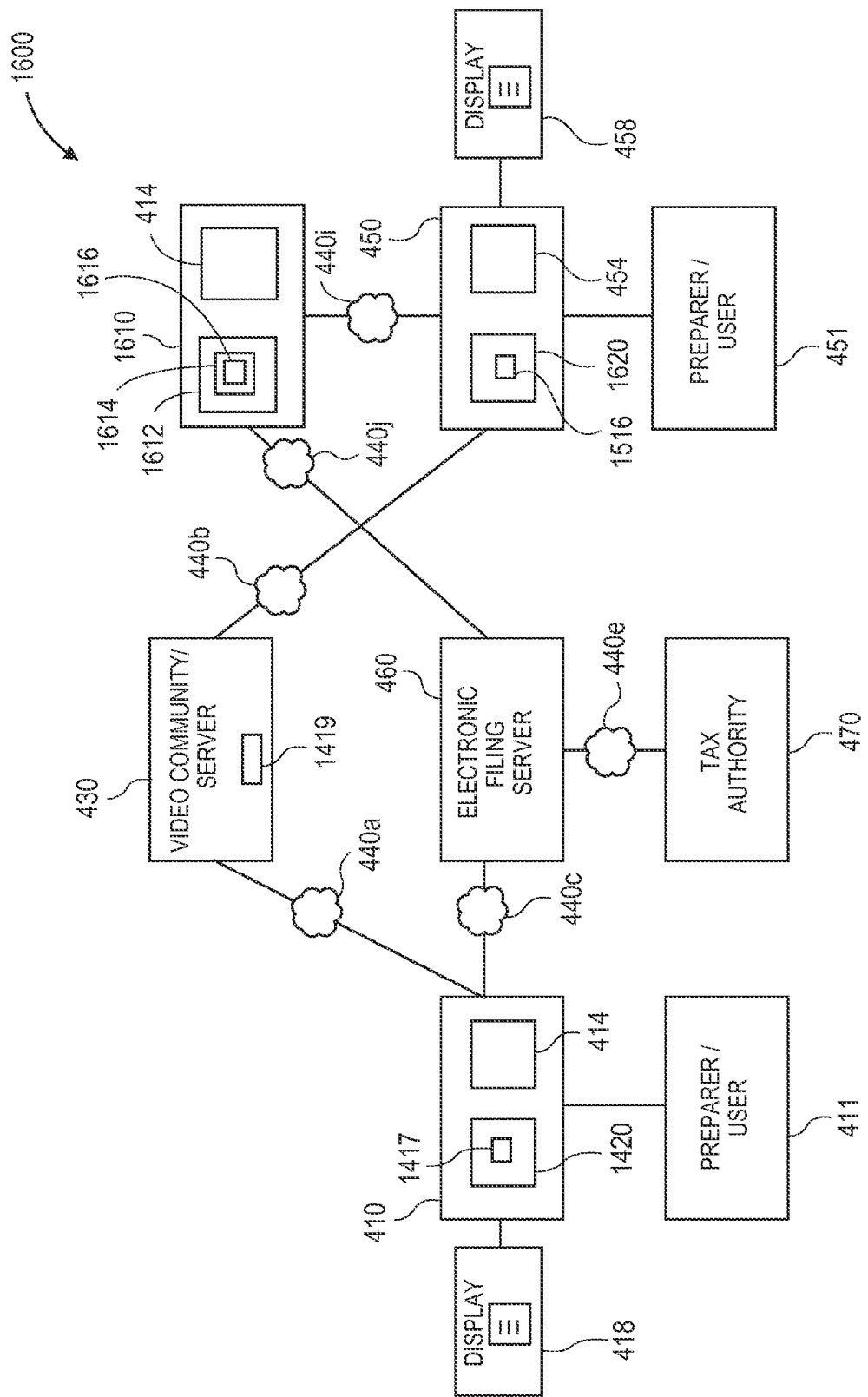
FIG. 16 illustrates a system constructed according to another embodiment in which a second person utilizes an on-line version of a tax preparation application.
Figure 17:
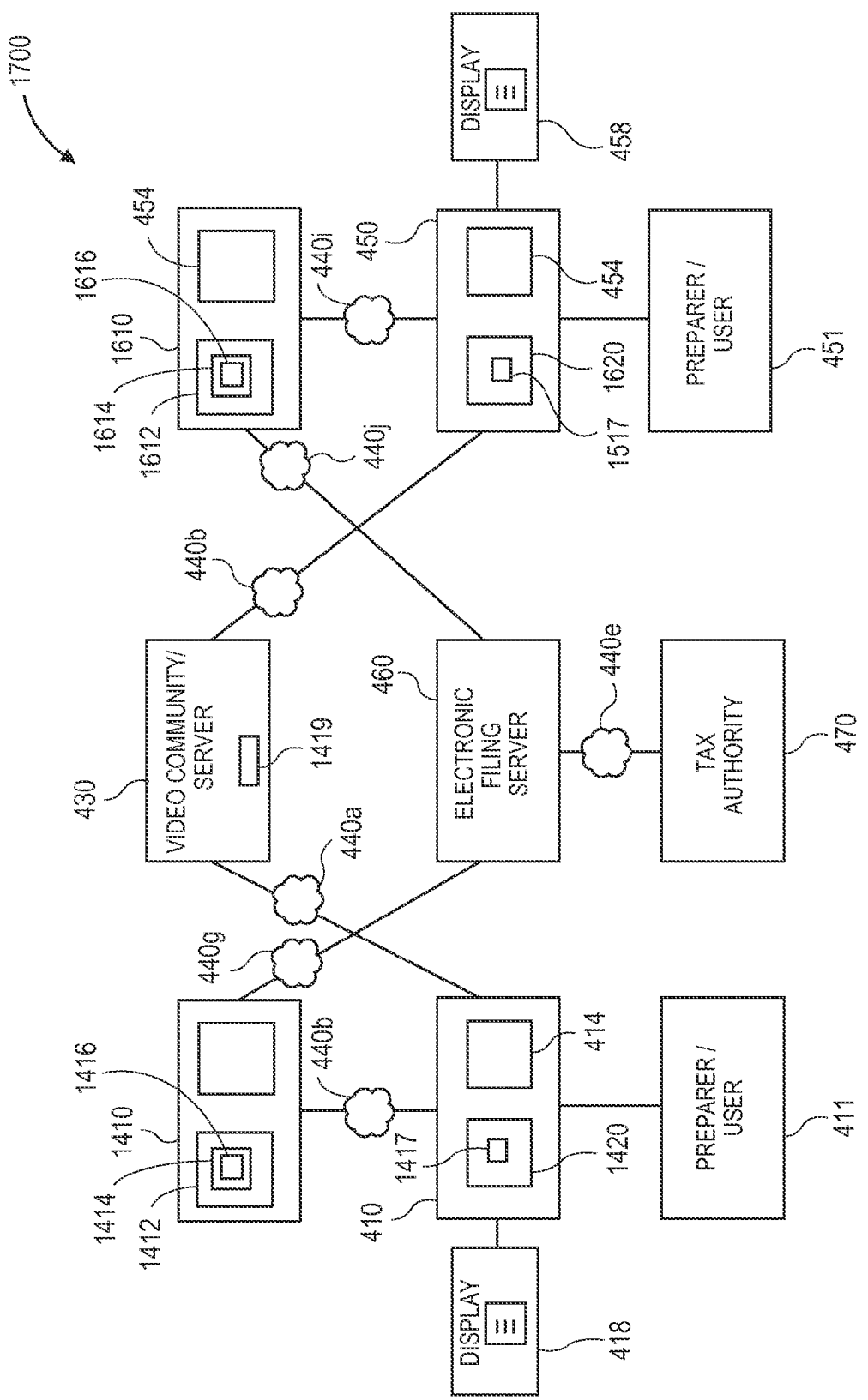
FIG. 17 illustrates a system constructed according to another embodiment in which a multiple people utilize respective on-line versions of a tax preparation application.

Methods that are the same as or similar to those methods described above with reference to FIGS. 2-15 may also be utilized in the system 1600 illustrated in FIG. 16, in which the second person 451 who uses the second computer 410, rather than the first person 411 who uses the first computer 410, accesses a second tax preparation application 1614 on a website 1612. The tax preparation application 1614 is accessed through a network 440i utilizing the web browser 1620 on the second computer 450. The tax preparation application 1614 or another element on the server 1610 has video processing components 1616 that are operable to outline fields for private data 457p. The outlined fields are detected or identified by a video processing or generation element 1516, which blurs or masks private data 457p within the outlined fields. The server 1610 is also in communication with an electronic filing server 460 via network 440j. Methods that are the same as or similar to those method described above with reference to FIGS. 2-15 may also be utilized in the system 1700 illustrated in FIG. 17, in which both the first person 411 and the second person 451 who utilize on-line versions of their respective tax preparation applications.

Figure 18:
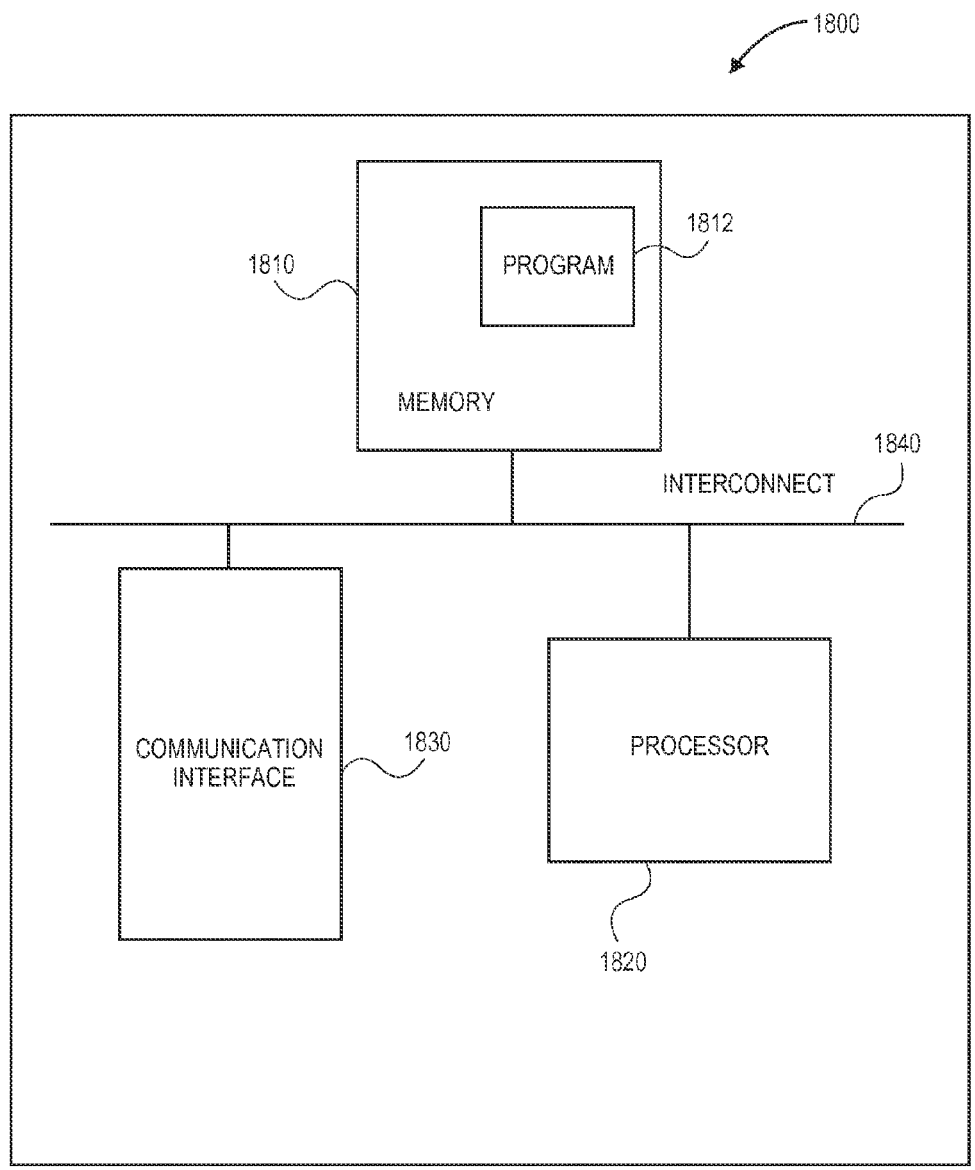
FIG. 18 is a system diagram of a computing apparatus that may be utilized by various system components.

A typical computing device 1800 in which embodiments may be implemented or that may be included in embodiments (e.g., as computers or servers 410, 430, 450) includes a memory 1810, program instructions 1812, a processor or controller 1820, a network or communications interface 1830, and connections or interconnect 1840 between such components. For example, the memory 1810 may be or include one or more of cache, RAM, ROM, SRAM, DRAM, RDRAM, EEPROM and other types of memory. A tax preparation application and a tax return may be stored in the memory 1810 of a computer 410, 450, and the tax preparation application can be executed by a processor unit 1820. The processor unit 1820 may be or include multiple processors, a single threaded processor, a multi-threaded processor, a multi-core processor, or other type of processor. Depending on the particular system component (e.g., whether the component is a computer or a hand held mobile communications device), the interconnect 1840 may include a system bus, LDT, PCI, ISA, or other types of buses, and the communications or network interface may, for example, be an Ethernet interface, a Frame Relay interface, or other interface. The network interface 1830 may be configured to enable a system component to communicate with other system components across a network. Accordingly, the system configuration provided in FIG. 18 is provided for ease of explanation and illustration to generally illustrate system components that may be utilized in various embodiments.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magnetooptical storage medium. Examples of carriers include, but are not limited to, a floppy diskette, a memory stick or a flash drive, CD-R, CD-RW, CD-ROM, DVD-R, and DVD-RW. The processor 1820 performs steps or executes program instructions 1812 within memory 1810 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, although embodiments are described with reference to an electronic tax return, embodiments may be applicable to blur or mask private data in other financial applications including personal finance and accounting applications. Further, embodiments may be applicable to blur or mask private data in databases such as certain government databases, student loan databases, on-line banking, and other applications that may utilize video as a communication medium.

It should also be understood that the various networks and associated communications interfaces described in the specification may be the same or different and may be, for example, a LAN, a WAN, a wireless and/or a cellular network.

Further, although certain embodiments involving outlining or marking a field for private data using a video processing element are described with reference to on-line tax preparation application and a server, these embodiments may also be utilized with desktop tax preparation applications. Thus, in certain embodiments, internal software tags are utilized with both desktop and on-line versions of financial applications, and in certain embodiments, video processing elements may mark a field with an identifying attribute (such as an outline, color, etc.), which is used to detect the fields that should be blurred or masked.

Moreover, it should be understood that embodiments can be applied to selectively blur or mask various types of private and non-private data, and that types of data that are classified or defined as private data can be programmed into a financial application or selected by a user of the financial application.

Accordingly, embodiments are intended to exemplify alternatives, modifications, and equivalents that may fall within the scope of the claims.

What is claimed is:

1. A computer-implemented method for processing a video for a user of a tax preparation application, the method comprising:
   receiving a first video at a first computer hosting a support community for the tax preparation application through a first network and from a second computer of a first user of the tax preparation application and of the support community for the tax preparation application, the first video comprising a first interview screen generated by the tax preparation application during preparation of the electronic tax return and including first data, wherein a portion of the first data cannot be viewed by other users or members of the support community;
   displaying the first video to a second user or member of the support community, wherein the second user cannot view the portion of the first data when viewing the first video;
   receiving a second video at the first computer through a second network and from a third computer of the second user or member, the second video comprising a second interview screen generated by the tax preparation application and including second data, wherein a portion of the second data cannot be viewed by the first user;
   displaying the second video to the first user or member, wherein the first user cannot view the portion of the second data while viewing the second video.

2. The method of claim 1, further comprising generating the first video including the masked portion of the first data.

3. The method of claim 2, further comprising generating the second video including the masked portion of the second data.

4. The method of claim 1, further comprising generating the second video including the masked portion of the second data.

5. The method of claim 1, further comprising transmitting the first video from the first computer to the third computer of the second user or member, and transmitting the second video from the first computer to the second computer of the first user or member.

6. The method of claim 1, wherein the portion of the first data is blurred or masked during or after generation of the first video to exclude the portion of the first data from the first video.

7. The method of claim 1, wherein the portion of the first data is private data comprising at least one of a name, an address, a phone number, a social security number and a date of birth.

8. The method of claim 1, wherein the first video comprises one or more frames of the first interview screen, each frame including one or more fields for the first data, the method further comprising tagging one or more fields within one or more frames to indicate the portion of the first data that cannot be viewed by other users or members of the support community.

9. The method of claim 8, wherein a tagged field is blurred or masked based at least in part upon the location of the tagged field within a frame.

10. The method of claim 8, further comprising:
    marking a tagged field with an identifying attribute;
    displaying the identifying attribute;
    detecting the identifying attribute to identify the field that has been tagged; and
    blurring or masking the identified field such that the portion of the first data is excluded from the first video and cannot be viewed by other users or members of the support community.

11. The method of claim 10, wherein the identifying attribute is at least one of an outline, a color, a pattern, and a brightness of a tagged field or portion or border thereof.

12. The method of claim 10, the second computer comprising a video processing element that marks the field with the identifying attribute such that when the first video is displayed to the second user or member, the video processing element detects the identifying attribute and blurs or masks the identified field such that the portion of the first data cannot be viewed by the second user or member.

13. The method of claim 1, the support community comprising a plurality of users of the tax preparation application.

14. The method of claim 1, the support community comprising technical support of a host of the tax preparation application.

15. The method of claim 1, the support community comprising a video-sharing website.

16. The method of claim 1, the support community being selected by the first user.

17. The method of claim 1, the portion of the first data of the first video that cannot be viewed by the support community being selected by the first user.

18. An article of manufacture comprising a non-transitory computer program carrier readable by a computer and embodying one or more instructions executable by the computer to perform method steps for processing a video for a user of a tax preparation application, the method comprising: receiving a first video at a first computer hosting a support community for the tax preparation application through a first network and from a second computer of a first user of the tax preparation application and a support community for the tax preparation application, the first video comprising a first interview screen generated by the tax preparation application during preparation of the electronic tax return and including first data, wherein a portion of the first data is cannot be viewed by other users or members of the support community; displaying the first video to a second user or member of the support community, wherein the second user cannot view the portion of the first data when viewing the first video; receiving a second video at the first computer through a second network and from a third computer of the second user or member, the second video comprising a second interview screen generated by the tax preparation application and including second data, wherein a portion of the second data cannot be viewed by the first user; and displaying the second video to the first user or member, wherein the first user cannot view the portion of the second data while viewing the second video.

19. A system for processing a video for a user of a tax preparation application, the system comprising a first computer hosting a support community for the tax preparation application, being operable to receive a first video through a first network and from a second computer of a first user of the tax preparation application and of the support community for the tax preparation application, the first video comprising a first interview screen generated by the tax preparation application during preparation of the electronic tax return and including first data, wherein a portion of the first data is cannot be viewed by other users or members of the support community; the first computer being further operable to display the first video to a second user or member of the support community, wherein the second user cannot view the portion of the first data when viewing the first video; the first computer being further operable to receive a second video through a second network and from a third computer of the second user or member, the second video comprising a second interview screen generated by the tax preparation application and including second data, wherein a portion of the second data cannot be viewed by the first user; and the first computer being further operable to display the second video to the first user or member, wherein the first user cannot view the portion of the second data while viewing the second video.

* * * * *